United States Patent [19]

Sugiura

[11] Patent Number: 5,538,352

[45] Date of Patent: Jul. 23, 1996

[54] TAPE PRINTING SYSTEM

[75] Inventor: Kazuhiko Sugiura, Hekinan, Japan

[73] Assignee: Brother Kogyo Kabushiki Kaisha, Nagoya, Japan

[21] Appl. No.: 307,457

[22] Filed: Sep. 19, 1994

[30] Foreign Application Priority Data

Sep. 21, 1993 [JP] Japan .................................. 5-259201

[51] Int. Cl.$^6$ ............................ B41J 11/48; G06K 15/00
[52] U.S. Cl. ........................................ 400/615.2; 400/83
[58] Field of Search .............................. 400/61, 76, 83, 400/615.2, 708

[56] References Cited

U.S. PATENT DOCUMENTS

| 4,544,289 | 10/1985 | McGourty | 400/615.2 |
| 4,836,697 | 6/1989 | Plotnick | 400/615.2 |
| 4,927,278 | 5/1990 | Kuzuya et al. | 400/208 |
| 5,066,152 | 11/1991 | Kuzuya et al. | 400/621 |
| 5,188,469 | 2/1993 | Nagao et al. | 400/615.2 |
| 5,253,334 | 10/1993 | Kimura et al. | 400/586 |
| 5,302,034 | 4/1994 | Kitazawa | 400/207 |

FOREIGN PATENT DOCUMENTS

| 225121 | 6/1987 | European Pat. Off. | 400/68 |
| 309751 | 4/1989 | European Pat. Off. | 400/68 |
| 0534794A2 | 3/1993 | European Pat. Off. | 400/615.2 |
| 550269 | 7/1993 | European Pat. Off. | 400/103 |
| 554612 | 8/1993 | European Pat. Off. | 400/103 |
| 574225 | 12/1993 | European Pat. Off. | 400/68 |

*Primary Examiner*—Edgar S. Burr
*Assistant Examiner*—Steven S. Kelley
*Attorney, Agent, or Firm*—Oliff & Berridge

[57] ABSTRACT

A tape printing system for printing a desired image on a desired tape includes: a data inputting device for inputting data indicative of a desired image, the data inputting device including a displaying for displaying the desired image; and a tape printing device connected to the data inputting device with a connecting line for receiving the data transferred through the connecting line from the data inputting device and for printing the desired image on a desired tape based on the received data. The tape printing device is formed with an information transferring portion for transferring information on the tape to the data inputting device through the connecting line, the information on the tape being displayed on the display.

15 Claims, 17 Drawing Sheets

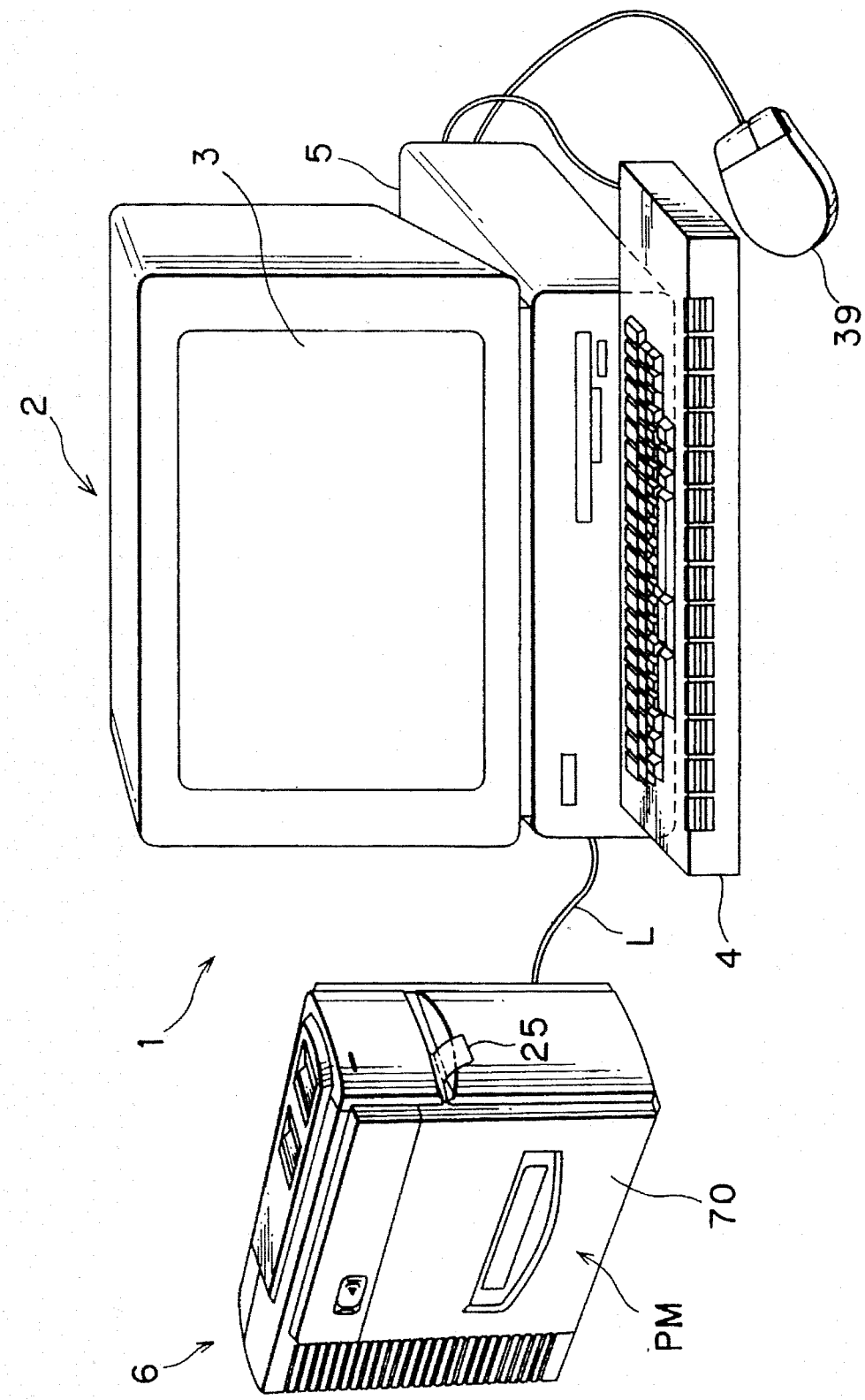

TAPE PRINTING SYSTEM

BACKGROUND OF THE INVENTION

1. Field of the Invention

The present invention relates to a tape printing apparatus for printing desired characters and symbols onto a tape to thereby produce a tape label.

2. Description of the Related Art

U.S. Pat. No. 5,066,152 has proposed a tape printing apparatus for printing characters and symbols on a tape (for example, with a width of 10 mm or 24 mm). As shown in FIG. 1, the tape printing apparatus of this document has a keyboard portion 100, a control portion (not shown), a liquid crystal display portion 101, and a printing mechanism portion 102 integrated with one another. This tape printing apparatus is suitable for use in printing file names on a tape which may be used as a label to be adhesively attached to the back of a file.

This conventional tape printing apparatus is that of an integral type, in which the keyboard portion, the control portion, the liquid crystal display portion, and the printing mechanism portion are integrated with one another. The key board portion is for inputting code data indicative of characters and symbols desired to be printed on a tape. The crystal display portion is for displaying the desired characters and symbols inputted through the operation of the key board portion. The control portion is or controlling the printing mechanism portion, according to the code data, to print the desired characters and symbols onto the tape. The printing mechanism portion is provided with a thermal head. The printing mechanism portion is detachably loaded with a tape cassette containing the tape that is suitable for printing the desired characters and symbols. The printing mechanism portion is controlled by the control portion to drive the thermal head so as to print the desired characters and symbols onto the tape contained in the tape cassette.

SUMMARY OF THE INVENTION

The present inventor has motivated to separate the print mechanism portion from the keyboard portion, the control portion and the display portion. Such a separate type tape printing system can be constructed from a combination of: a data generating device formed from a keyboard, a control portion and a display; and a tape printing device formed from the printing mechanism portion. The data generating device and the tape printing device may be connected with a connecting line. According to this separate type tape printing system, the data generating device can employ a large display such as a CRT display as the display portion. It is easy to operate with the large display. The large display cooperates with the control portion to enable not only to process the code data of characters and symbols inputted directly from the keyboard but also to produce various image data indicative of various complicated images. In addition, a plurality of generating devices can be connected to a single tape printing device so that a plurality of users can achieve the tape printing performances, with the use of the single printing device.

It is preferable that the tape printing system be detachably mounted with plural kinds of tape cassettes containing print tapes of different tape widths, 6 mm, 9 mm, 12 mm, . . . , 24 mm, and different tape colors, red, blue, yellow, . . . , white, for each tape width, so that a suitable print tape can be selected therefrom according to the area and color of the file onto which the tape is attached.

According to the inventor's motivated tape printing system, an operator inputs code data indicative of desired characters and symbols into the data generating device and processes various image data indicative of desired images. It is therefore possible to make printing of the desired characters and symbols and images on a tape contained in a tape cassette loaded in the tape printing device.

However, because there are thus present plural kinds of tape cassettes containing various print tapes, there may occur such problems that it is necessary for the operator to go over to the tape printing device before inputting code data and producing image data for printing, so as to confirm the tape cassette loaded in the tape printing device. If the tape is not confirmed, the print tape might be wastefully used when the tape width or color of the tape in the loaded tape cassette is not what is desired.

It is therefore, an object of the present invention to overcome the above-described drawbacks, and to provide a separate-type tape printing system in which the operator on the side of the data generating device can easily recognize the information related to the tape cassette loaded in the tape printing device such as the width and color of the tape.

In order to attain the above object and other objects, the present invention provides a tape printing system for printing a desired image on a desired tape, comprising: a data inputting device for inputting data indicative of a desired image, the data inputting device including displaying means for displaying the desired image; and a tape printing device connected to the data inputting device with a connecting line for receiving the data transferred through the connecting line from the data inputting device and for printing the desired image on a desired tape based on the received data, the tape printing device including information transferring means for transferring information on the tape to the data inputting device through the connecting line, the information on the tape being displayed on the displaying means.

The data inputting device may preferably further include display controlling means for controlling the displaying means to display the information on the tape transferred from the tape printing device.

The tape printing device may include tape cassette receiving means for receiving a tape cassette containing a tape and for printing the desired document on the tape contained in the tape cassette. The information transferring means may preferably include cassette information detecting means for detecting information on the tape cassette received in the tape cassette receiving means and for transferring the information on the tape cassette to the data inputting device through the connecting line.

The data inputting device may further include: desired cassette information inputting means for inputting information on a tape cassette desired to be printed with the desired document; and information judging means for judging whether or not the information on the desired tape cassette inputted from the desired cassette information inputtting means agrees with the information on the tape cassette received in the tape cassette receiving means of the tape printing device transferred from the cassette information detecting means.

The information transferring means may further transfer information on the tape printing device through the connecting line to the data inputting device, the display controlling means controlling the displaying means to display the information on the tape printing device transferred from the tape printing device.

According to another aspect, the present invention provides a tape printing apparatus for printing a desired document on a tape, comprising: a data generator for generating dot image data indicative of a desired document, the data generator including: input means for inputting characters and symbols constituting the desired document and for inputting various commands; data storage means for storing data of the inputted characters and symbols; display means for displaying the inputted characters and symbols; and data development means for developing the data received from said data storage means into dot image data for the print output; and a printer connected with the data generator with a connecting line for receiving the dot image data from the data generator to print the desired document on the tape, the printer including: a tape cassette loading portion for loading a tape cassette, which contains a roll of tape as printing medium and a roll of ink ribbon for printing on the tape; a printing portion for driving in response to the dot image data transferred from the data generator to print the desired document in dot patterns on the tape from the tape cassette; cassette information detection means for detecting cassette information including at least one of tape width and ink ribbon color of the tape cassette loaded in the tape cassette loading portion; and information transfer means for transferring the cassette information detected by said cassette information detection means to said data generator through the connecting line, the cassette information being displayed on the display means of the data generator.

The data generator may further include information display control means for receiving the cassette information transferred from the information transfer means and for controlling the display means for displaying the cassette information.

The data generator may further include: desired cassette information inputting means for inputting information on a tape cassette, desired to be printed with the desired document, which includes at least one of a desired tape width and a desired ink ribbon color; and information judging means for judging whether or not the information on the desired tape cassette inputted from the desired cassette information inputtting means agrees with the cassette information detected by the cassette information detection means.

The printing portion may include: tape feeding means for feeding the tape contained in the tape cassette; printing means for driving in response to the dot image data to print the desired document in dot patterns on the tape contained in the tape cassette fed by the tape feeding means; and cutting means for cutting the tape printed with the desired document by the printing means. The tape printer may further include print information detection means for detecting the status of at least one of the tape feeding means, the printing means and the cutting means, the information transfer means transferring the status detected by the print information detection means to said data generator through the connecting line, the information display control means receiving the information on the status transferred from the information transfer means and for controlling the display means to display the information on the status.

BRIEF DESCRIPTION OF THE DRAWINGS

The above and other objects, features and advantages of the invention will become more apparent from reading the following description of the preferred embodiment taken in connection with the accompanying drawings in which:

FIG. 3 is a perspective view of a concrete example of the tape printing system of the present embodiment;

DETAILED DESCRIPTION OF THE PREFERRED EMBODIMENTS

Figure 1:
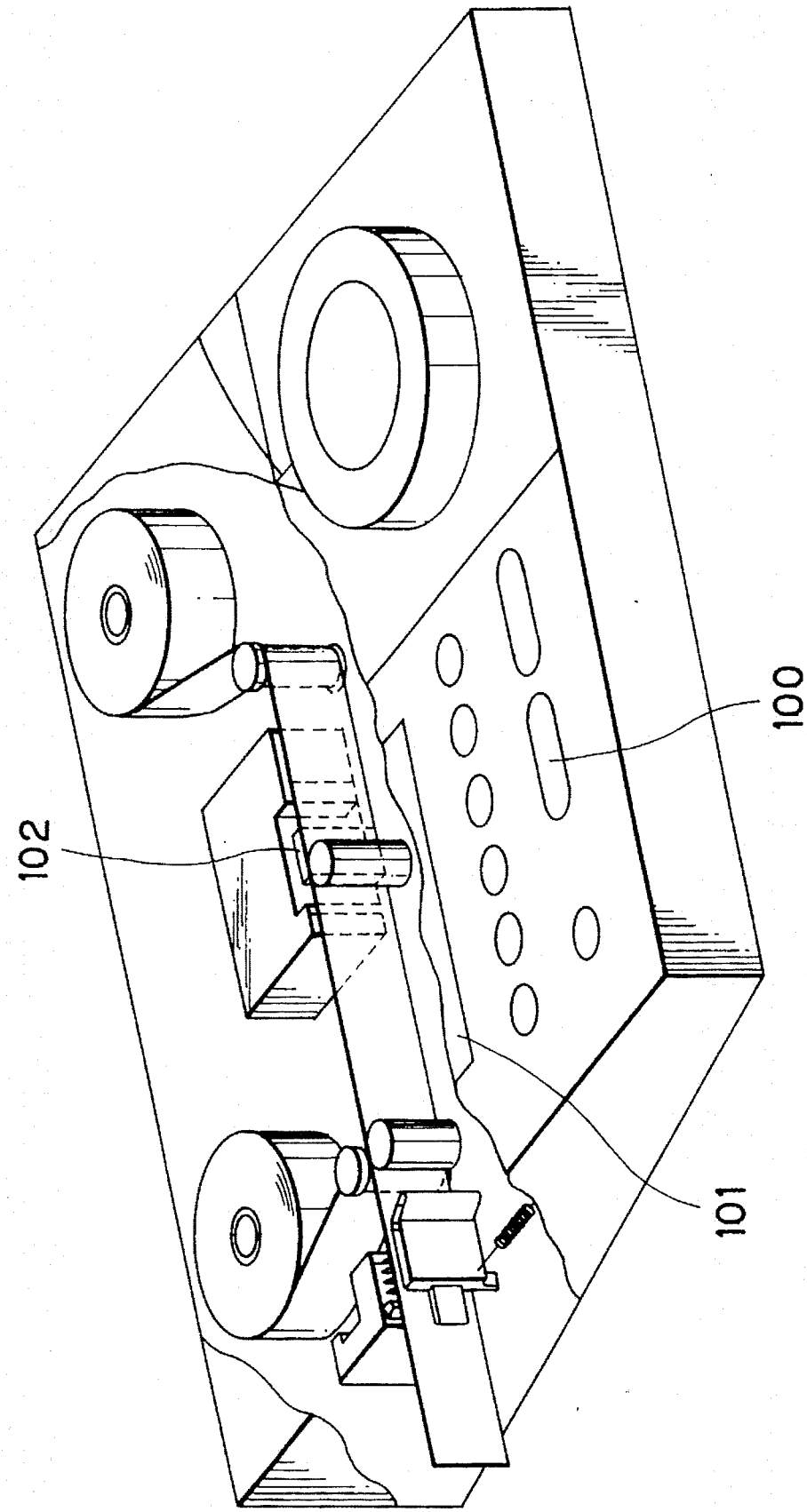
FIG. 1 illustrates a conventional tape printing apparatus of an integral type.

A separate-type tape printing system or apparatus according to a preferred embodiment of the present invention will be described while referring to the accompanying drawings wherein like parts and components are designated by the same reference numerals as those shown in FIGS. 2 through 15 to avoid duplicating description.

The printing system of the present invention is constituted of a data generator and a tape printer which is separated from the data generator and connected to the same with a connecting line. According to the present invention, information as to the tape cassette loaded in the tape printer is transferred to the data generator to be displayed.

Figure 2:
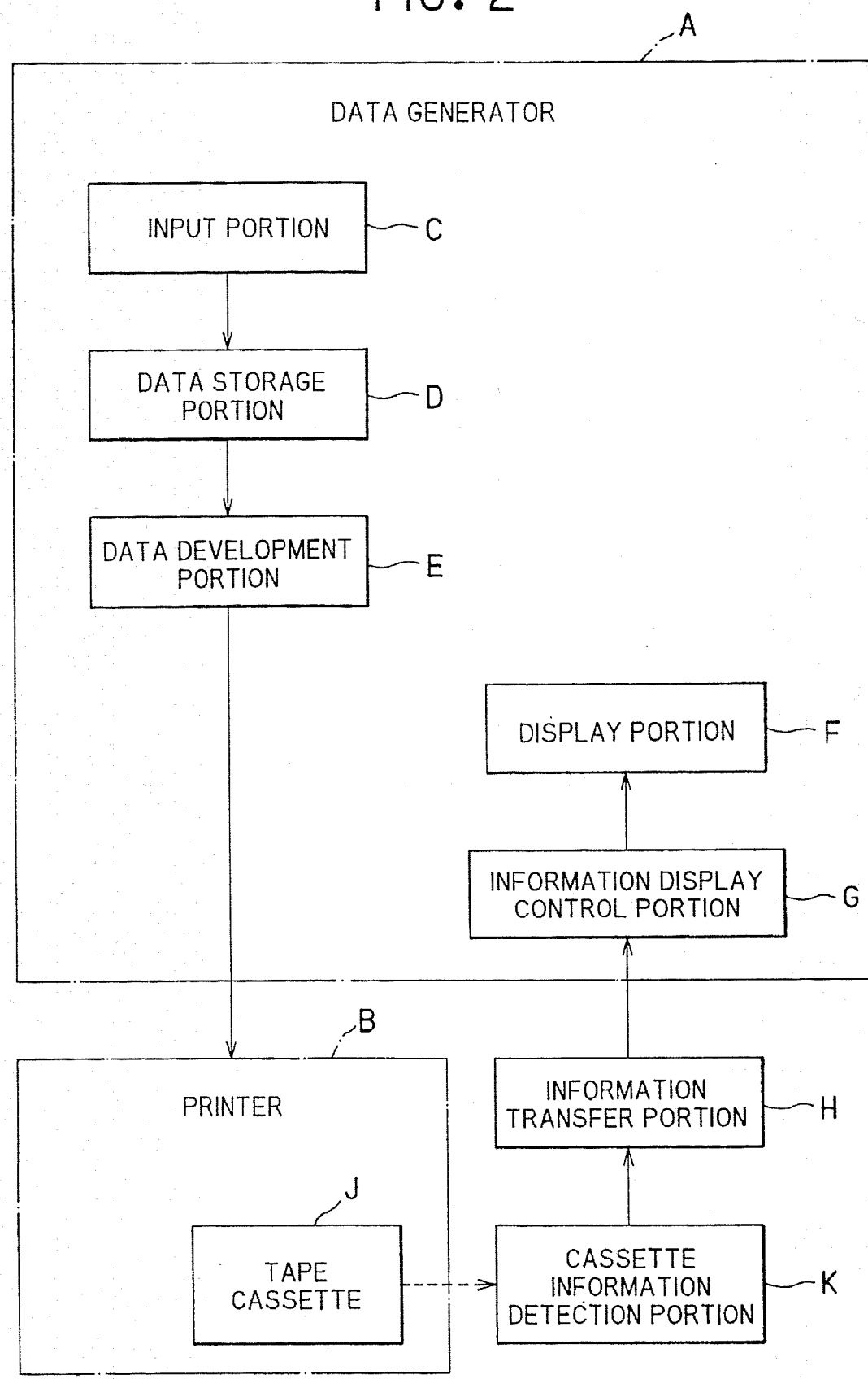
FIG. 2 is a functional block diagram briefly showing structure of a separate-type tape printing system of an embodiment of the present invention.

The tape printing system according to the embodiment of the present invention will be first described briefly below, with reference to FIG. 2.

The tape printing system of the present embodiment is constituted of a data generator A including an input portion C for inputting characters, symbols, and various commands, a data storage portion D for storing data of input characters and symbols, a display portion F having a display capable of displaying characters and symbols, and a data development portion E for developing the data received from the data storage portion D into dot image data to be outputted for printing, and a printer B receiving a tape cassette J, which contains a roll of tape as the printing medium, chargeably loaded therein, receiving dot image data from the data generator A through a connecting line, and printing the received data in dot patterns on the tape from the tape cassette J. The tape printing system further includes a cassette information detection portion K for detecting cassette information including at least the tape width and the tape color of the tape in the tape cassette loaded in the printer, an information transfer portion H for transferring the cassette information outputted from the cassette information detection portion K to the data generator A through the connecting line, and an information display control portion G, provided in the data generator A, receiving the cassette information transferred through the information transfer portion H for causing the cassette information to be displayed on the display of the display means.

In the tape printing system having the above structure, since the cassette information detection portion K detects the cassette information including at least the width and color of the tape in the tape cassette loaded in the printer, the information transfer portion H transfers the cassette information output from the cassette information detection portion K to the data generator A through the connecting line.

On the other hand, the information display control portion G provided in the data generator receives the cassette information transferred from the information transfer portion H and causes the cassette information to be displayed on the display of the display portion F. As a result, the cassette information is displayed on the display and, hence, at least the tape width and tape color of the tape in the tape cassette loaded in the printer can be recognized on the side of the data generator A.

Since the cassette information including at least the tape width and tape color of the tape in the tape cassette loaded in the printer is detected and transferred to the data generator and displayed on the display of the display portion provided in the data generator, the operator need not go over to the printer which is a separate body from the data generator and can simply recognize at least the width and color of the tape in the tape cassette from the display on the side of the data generator. Further, since it can be confirmed whether the tape is the desired one from the displayed cassette information, the tape can be prevented from being wastefully used and correct print outputting can be achieved using a rightful tape.

A concrete example of the embodiment of the invention will be described with reference to FIGS. 3 through 15.

This example is a tape printing system designed exclusively for English language characters and symbols and capable of printing on a print tape a plurality of English characters such as alphanumeric characters and symbols inputted thereto.

As shown in FIG. 3, the tape printing system 1 includes a data generator 2 and a tape printing device 6 separated from each other. The data generator 2 is constructed from: a CRT display 3 capable of displaying plural lines of characters and symbols; a keyboard 4; a coordinate inputting device (hereinafter referred to as a mouse) 39; and a controller 5. The controller 5 can be constructed from various types of computers, such as a personal computer. The CRT display 3, the keyboard 4, and the mouse 39 are connected to the controller 5 with respective connecting lines. The tape printer 6 is connected to the controller 5 of the data generator 2 with a connecting line L.

On the keyboard 4, there are arranged such keys as alphanumeric character keys and symbol keys for inputting code data indicative of alphanumeric characters (i.e., alphabetic characters and numeric characters) and symbols, a space key, a return key, cursor moving keys for moving the cursor on the CRT display 3 in the vertical and horizontal directions, a print key for instructing printing operation, a document title setting key for setting a title of a document desired to be printed on a tape, a document size setting key for setting a size of a document desired to be printed on a tape, an automatic cutting mode key for setting an automatic cutting mode and a tape cassette-information designating key for designating a tape color, a tape width, a tape kind, and an ink ribbon color of a tape cassette on which a document is desired to be printed.

Operating the alphanumeric character keys and the symbol keys can therefore input code data of desired alphanumeric characters and symbols. The alphanumeric characters and symbols desired to be printed on a tape are referred to as a desired document, hereinafter. Operating the document title setting key and the document size setting key can set a title and a size of the desired document. Operating the tape cassette-information designating key can designate a desired cassette information including a tape width, a tape color, a tape kind and an ink ribbon color of a tape cassette desired to be printed. Operating the keys can also input a block changing code for forming a group of alphanumeric characters and symbols into a block defined in a longitudinal direction of a tape and a data end code indicative of an end of a document. Operating an automatic cutting mode key can also set an automatic cutting operation mode.

Referring to FIG. 3, the tape printer 6 is formed with a printing mechanism portion PM. A tape containing rectangular-shaped cassette CS is removably loaded into the printing mechanism portion PM. The printing mechanism portion PM is constructed from a cassette receiving portion 71 shown in FIG. 4A covered with a cover 70 which is pivotably supported to the bottom of the tape printer 6.

Figure 4A:
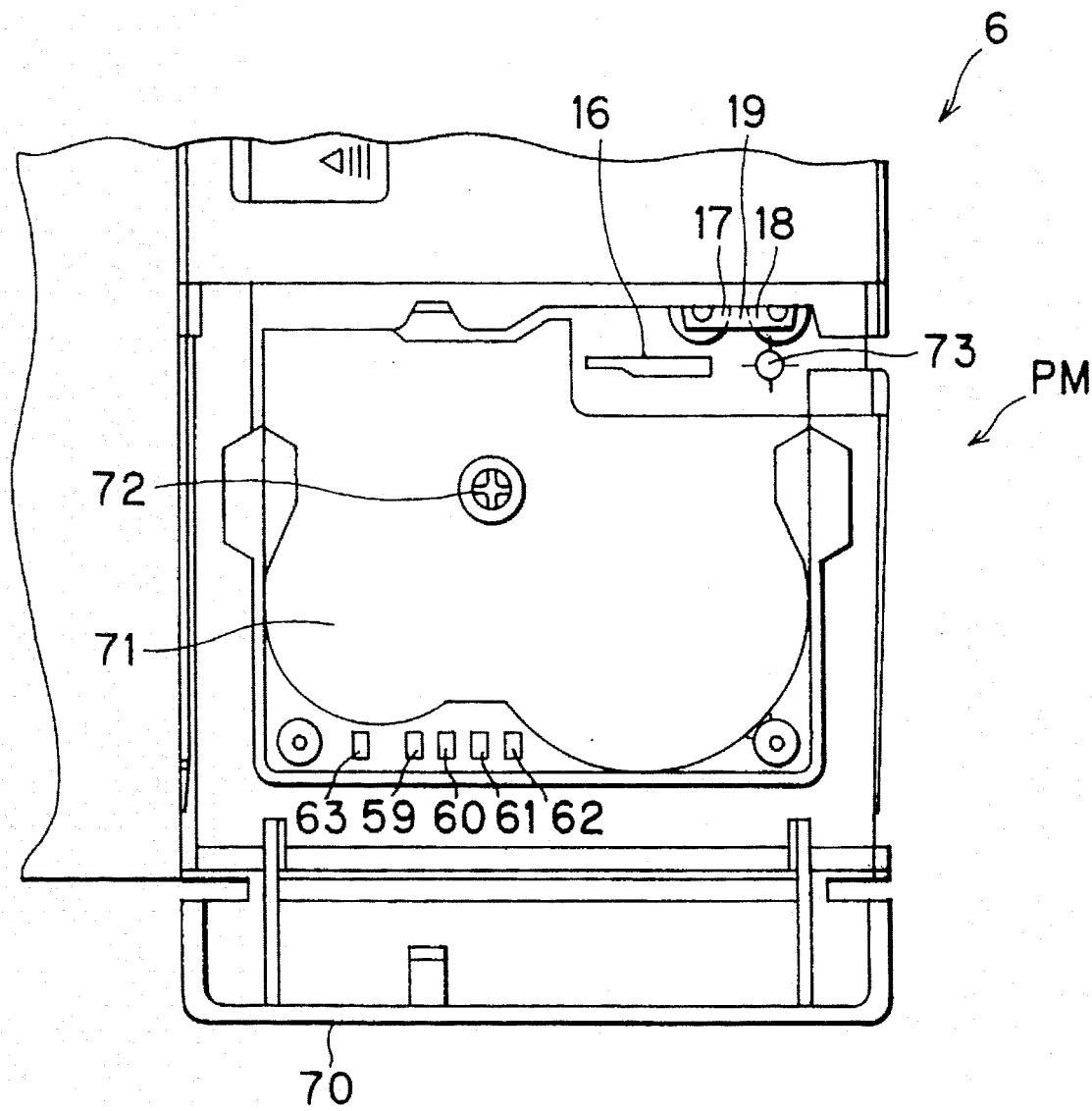
FIG. 4A is a front view schematically showing the printing mechanism portion PM of the tape printer unloaded with a tape cassette, with a cover being opened.

As shown in FIG. 4A, a take-up axis 72 and a tape feed roller axis 73 are provided to the cassette receiving portion 71. The take-up axis 72 and the tape feed roller axis 73 are rotatably driven by a tape feed motor 50 (shown in FIG. 5) in their predetermined directions. A thermal head 16 is fixedly provided in the cassette receiving portion 71. The thermal head 16 is provided with a train of 128 heating elements aligned in the horizontal direction.

Figure 4B:
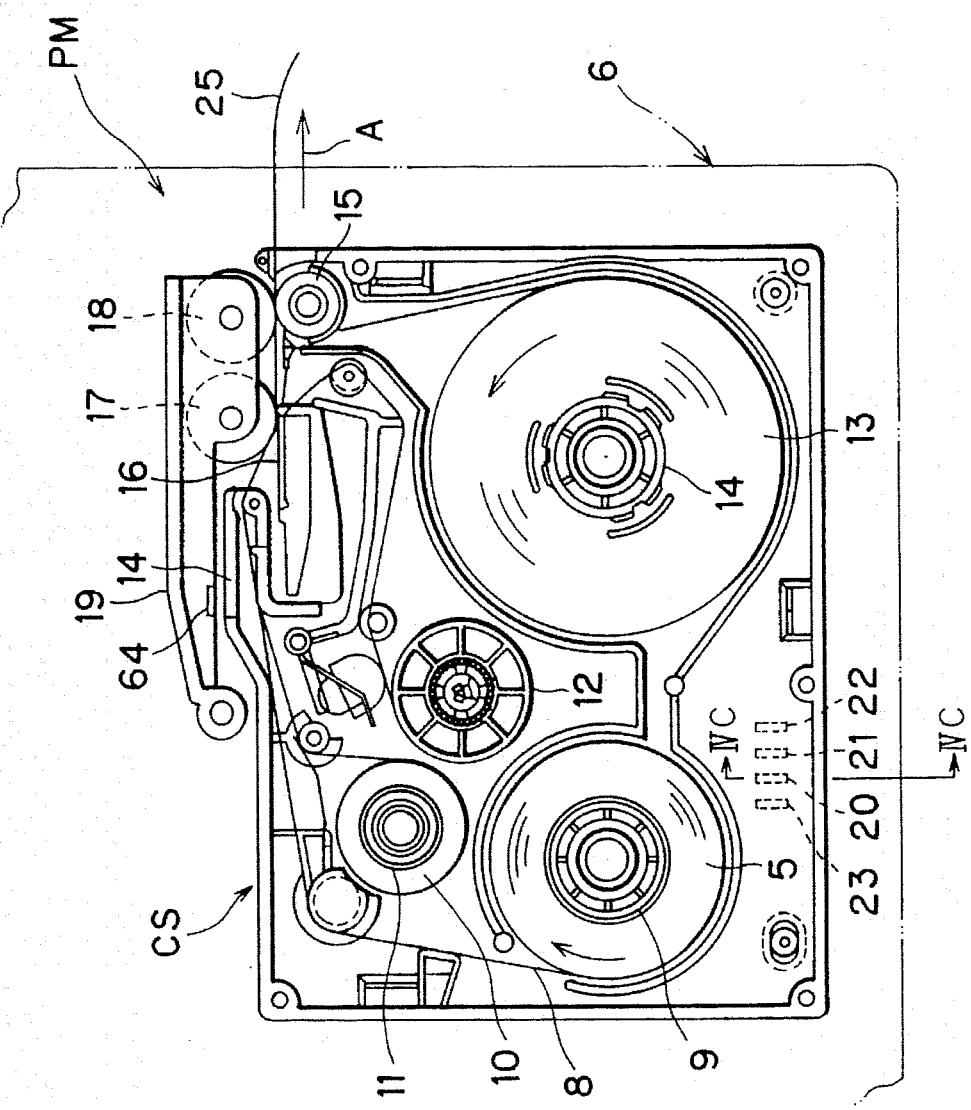
FIG. 4B schematically shows the printing mechanism portion PM of the tape printer loaded with a tape cassette.

As shown in FIG. 4B, a platen roller 17 and a feed roller 18 are pivotally supported for rotation on a support member 19 which is pivotally mounted for rotation in the cassette receiving portion 71. A tape end sensor 64 is provided to the support member 19 for detecting an end of a tape contained in the tape cassette CS. As shown in FIG. 4A, the cassette receiving portion 71 is further provided with a tape-width sensor 60, a tape-color sensor 61, a tape-kind sensor 62, and an ink ribbon-color sensor 59 for detecting tape width, tape color, tape kind, and ink ribbon color of a tape cassette loaded in the cassette receiving portion 71. The cassette receiving portion 71 is further provided with a cassette switch 63 for detecting whether or not a tape cassette is loaded in the cassette receiving portion 71.

The printing mechanism portion PM constructed from the above-described cassette receiving portion 71 will be described in more detail below with referring to FIG. 4B. FIG. 4B shows the state how a laminate-type tape cassette CS for producing a laminate-type tape 25 is loaded in the cassette receiving portion 71.

Within the tape cassette CS, there are rotatably provided a tape spool 9 around which a transparent laminate film 8 is wound, a ribbon supply spool 11 around which an ink ribbon 10 is wound, a take-up spool 12 for taking up the ink ribbon 10, a supply spool 14 around which a double coated tape 13 with the same width as the laminate film 8 is wound with its peel-off paper on the outside, and a joining roller 15 for causing the double-coated tape 13 to adhere to the laminate film 8. The tape cassette CS is loaded in the cassette receiving portion 71, with the joining roller 15 being connected to the tape feed roller axis 73 and the take-up spool 12 being connected to the take-up axis 72. Accordingly, the joining roller 15 and the take-up spool 12 are operatively connected to the tape feed motor 50. The tape feed motor 50 rotates in its predetermined direction to drive the joining roller 15 and the take-up spool 12 in their predetermined rotating directions in synchronism with each other. The tape feed motor 50, the tape feed roller axis 73, the joining roller 15, the take-up axis 72, and the take-up spool 12 construct a tape feeding mechanism.

The thermal head 16 fixedly mounted in the cassette receiving portion 71 is positioned where the laminate film 8 and the ink ribbon 10 overlap each other when the tape cassette CS is loaded in the cassette receiving portion 71. The platen roller 17 provided on the support member 19 serves to press the laminate film 8 and the ink ribbon 10 of the tape cassette CS against the thermal head 16. The feed roller 18 also provided on the support member 19 serves to press the laminate film 8 and the double coated tape 13 against the joining roller 15 to thereby form the print tape 25.

With the above-described structure, when the heating elements of the thermal head 16 are supplied with electric current while the joining roller 15 and the take-up spool 12 are driven in synchronism with each other by the rotation of the tape feed motor 50, characters and symbols are printed on the laminate film 8 in the form of plural trains of dots. Then, the double coated tape 13 is attached to the laminate film 8, and the produced tape is fed, as the print tape 25, in the tape feeding direction A to be discharged from the printer 6 as shown in FIG. 4B. Although it is not shown, the printing mechanism portion PM is provided with a tape cutting mechanism which has a movable blade and a stationary blade, of which the movable blade is swung by a cutter drive motor 65 (refer to FIG. 5) and the print tape 25 undergone the printing is cut through cooperation of the movable blade and stationary blade. Details of the printing mechanism portion PM in the tape printer are described in U.S. Pat. No. 5,188,469, the disclosure of which is hereby incorporated by reference.

As the print tape 25 to be obtained from the tape cassette CS mountable in the tape printer 6 of the present invention, there are provided four kinds of tapes: the laminate-type tape 25 described above with reference to FIG. 4B and formed from the laminate film 8 and the double coated tape 13 stuck together; a non-laminate type tape 25 eliminating the use of the laminate film 8 and adapted for printing on a single-coated tape with the peel-off paper adhesively attached to its outer side; a heat-sensitive type tape 25; and an instant-lettering type tape 25. The tape cassette for the laminate-type tape is described in detail, for example, in U.S. Pat. Nos. 5,302,034 and 4,927,278, the disclosure of which is hereby incorporated by reference. The tape cassette for the non-laminate-type tape is described, for example, in detail in U.S. Pat. No. 5,302,034, the disclosure of which is hereby incorporated by reference. The tape cassette for the heat-sensitive tape is described in detail in co-pending U.S. patent application Ser. No. 08/270,242 filed on Jul. 5, 1994 by T. Nagae, et al., the disclosure of which is hereby incorporated by reference. The tape cassette for the instant-lettering type tape is described in detail, for example, in U.S. Pat. No. 4,927,278, the disclosure of which is hereby incorporated by reference.

For each of the four kinds of tape cassette, there are provided five kinds of tapes 25 whose widths are 6 mm, 9 mm, 12 mm, 18 mm, and 24 mm. Further, for each of the widths of the print tapes 25, there are provided thirteen tape colors, such as red, blue, yellow, green, etc.

It is further noted that for each of the tape colors, there are provided about ten ink ribbon colors (colors of ink ribbons), such as black, red, blue, gold, silver, etc.

As shown in FIG. 4B, on the bottom wall of each tape cassette CS, there are provided a first projecting piece 20, a second projecting piece 21, a third projecting piece 22 and a fourth projecting piece 23. The first through fourth projecting pieces 20 through 23 formed on each tape cassette CS are for indicating a tape-width, a tape-color, a tape-kind, and an ink ribbon color of each tape cassette CS. The first projecting piece 20 is formed with three projecting claws for discriminating in combination one from the five tape widths. The second projecting piece 21 is formed with four projecting claws for discriminating in combination one from the 13 tape colors. The third projecting piece 22 is formed with two projecting claws for discriminating in combination one from the four kinds of tapes. The fourth projecting piece 23 is formed with four projecting claws for discriminating in combination one from the about ten ink ribbon colors.

As shown in FIG. 4A, on the frame of the printing mechanism portion PM in the tape printer 6, there are provided a tape-width sensor 60, a tape-color sensor 61, a tape-kind sensor 62 and an ink ribbon color sensor 59. When the tape cassette CS is loaded in the cassette receiving portion 71, the sensor 60 confronts the projecting piece 20, the sensor 61 confronts the projecting piece 21, the sensor 62 confronts the projecting piece 22, and the sensor 59 confronts the projecting piece 23. The tape-width sensor 60 is for detecting the condition of the projecting claws of the first projecting piece 20 to thereby detect the tape width. The tape-color sensor 61 is for detecting the condition of the projecting claws of the second projecting piece 21 to thereby detect the tape color. The tape-kind sensor 62 is for detecting the condition of the projecting claws of the third projecting piece 22 to thereby detect the kind of the tape. The ink ribbon color sensor 59 is for detecting the condition of the projecting claws of the fourth projecting piece 23 to thereby detect the color of the ink ribbon contained in the tape cassette.

Figure 4C:
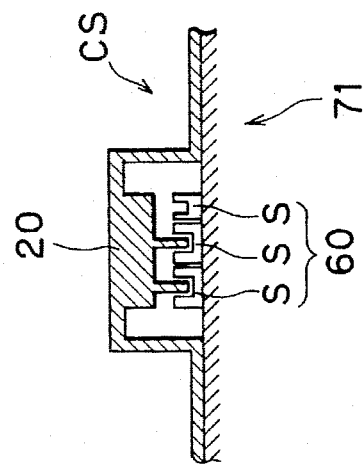
FIG. 4C is a cross sectional view taken along a line IVC—IVC of FIG. 4B for showing a structure of photocouplers S constituting the sensor 60 and claws projecting from the projecting piece 20.

As shown in FIG. 4C, the tape-width sensor 60 is made from three photocouplers S, each having a light-emitting diode paired with a photodetector. Each of the three photocouplers is located at a position capable of receiving a corresponding one of the three projecting claws of the first projecting piece 20. Each photosensor therefore detects whether or not the corresponding projecting claw is inserted between the light-emitting diode and the photodetector.

Similarly, the tape-color sensor 61 is made from four photocouplers S, each being located at a position capable of receiving a corresponding one of the four projecting claws of the second projecting piece 21 for detecting whether or not the corresponding projecting claw is inserted between the light-emitting diode and the photodetector.

Similarly, the tape-kind sensor 62 is made from two photocouplers S, each being located at a position capable of receiving a corresponding one of the two projecting claws of the third projecting piece 22 for detecting whether or not the corresponding projecting claw is inserted between the light-emitting diode and the photodetector.

Similarly, the ink ribbon color sensor 59 is made from four photocouplers S, each being located at a position capable of receiving a corresponding one of the four projecting claws of the fourth projecting piece 23 for detecting whether or not the corresponding projecting claw is inserted between the light-emitting diode and the photodetector.

The cassette switch 63 provided in the cassette receiving portion 71 is for detecting that a tape cassette cassettes CS is loaded in the printing mechanism portion PM. The cassette switch 63 outputs a cassette detect signal SS at an "H" level when a tape cassette CS is loaded and outputs a cassette detect signal SS at an "L" level when a tape cassette CS is not loaded.

Figure 4D:
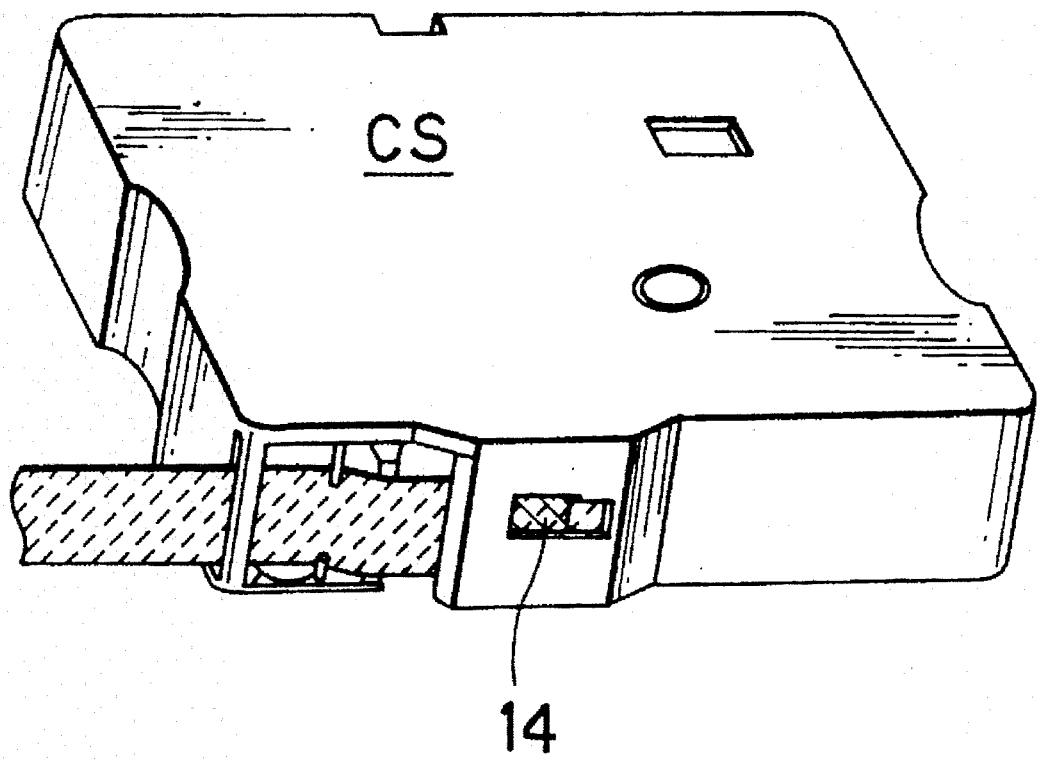
FIG. 4D is a perspective view of a tape cassette CS.

The tape end sensor 64 provided on the support member 19 is for detecting whether or not the tape contained in the cassette CS reaches its end. More specifically, the tape end sensor 64 detects whether or not an end portion of a tape reaches a tape window 14 provided in the tape cassette CS as shown in FIG. 4D. The tape-end sensor 64 outputs a tape-end detect signal ES at an "H" level when the tape is at its end and outputs a tape-end detect signal ES at an "L" level when the tape is not at its end.

Figure 5:
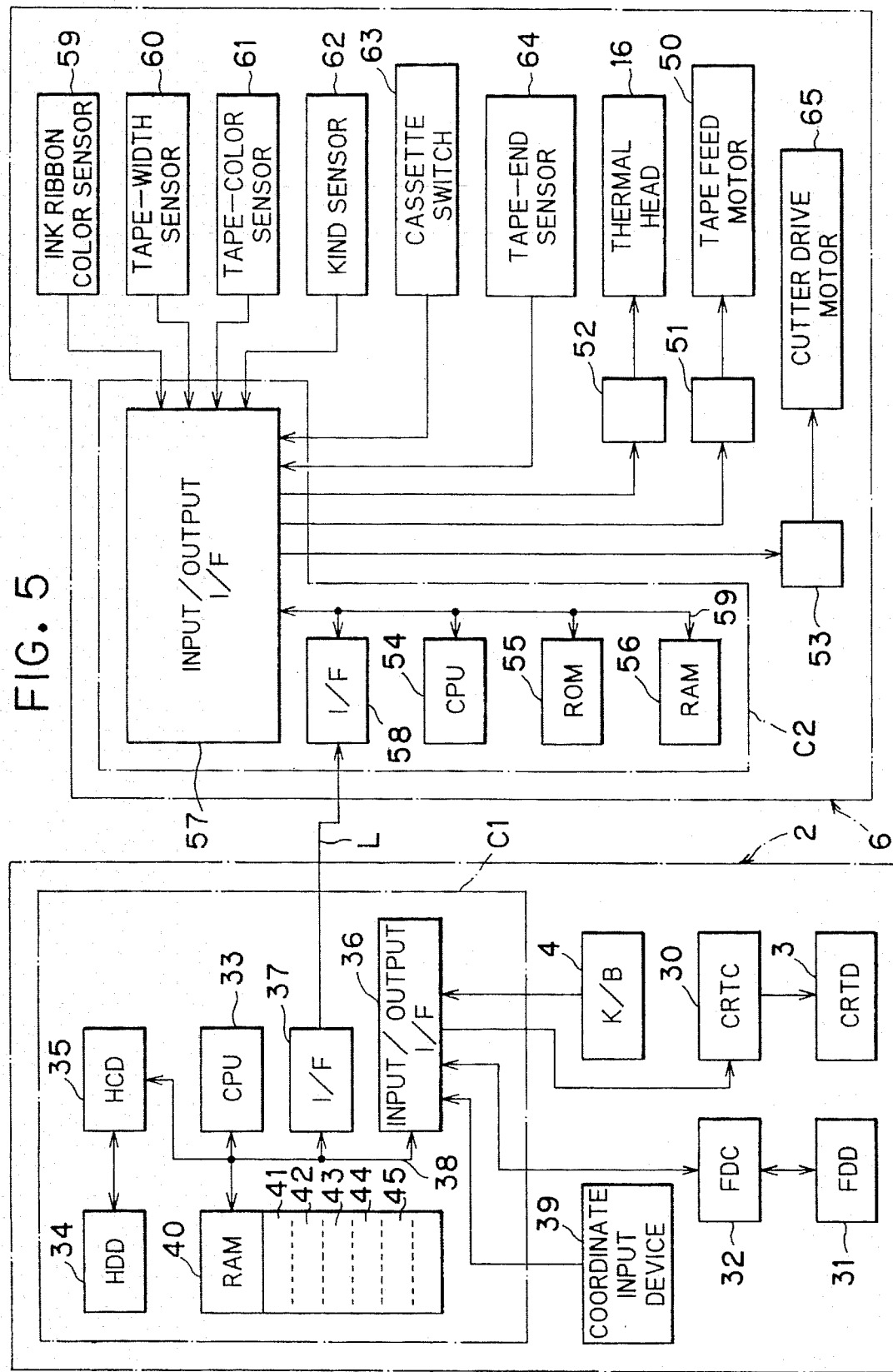
FIG. 5 is a block diagram of the control system of the tape printing system of the embodiment.

The control system of the tape printing system 1 is structured as shown in the block diagram of FIG. 5.

The control system of the data generator 2 will first be described.

The controller 5 of the data generator 2 has a control portion C1, a floppy disk drive (FDD) 31, a floppy disk drive controller (FDC) 32 for controlling the floppy disk drive (FDD) 31, and a CRT display controller (CRTC) 30 having a display RAM for outputting display data to the CRT display (CRTD) 3. The control portion C1 has an input/output interface (input/output I/F) 36 which is connected with the keyboard (K/B) 4, the CRT display controller (CRTC) 30, the floppy disk drive controller (FDC) 32, and the coordinate inputting device (mouse) 39. The control portion C1 further includes a CPU 33, a communication interface (I/F) 37, a hard disk drive controller (HDC) 35 for controlling a hard disk driver (HDD) 34 having a hard disk incorporated therein, and a RAM 40. The input/output interface 36, the communication interface 37, the hard disk drive controller (HDC) 35, and the RAM 40 are connected to the CPU 33 with a bus 38 such as a data bus.

The hard disk has a display pattern data memory and a font memory. The display pattern data memory stores therein dot pattern data for displaying each of a number of characters and symbols in correspondence with a number of code data inputtable by the keyboard 4. The font memory stores therein outline data representing the outline of each of the number of characters and symbols classified for each of a plurality of typefaces (such as the Gothic type and Mingcho type) in correspondence with each of the number of inputtable code data. The hard disk further stores: a display drive control program for controlling the CRT display controller 30 to operate the CRT display 3 in response to the code data of characters and symbols of a desired document inputted from the keyboard 4; a dot image development control program for converting the outline data of the characters and symbols of the desired document represented by the inputted code data into dot image data and for outputting the dot image data to the tape printer 6; and a control program (which will be described later) for controlling the print data generation, which is characteristic of this invention.

The RAM 40 is formed with a text memory 41, a dot image memory 42, a document information memory 43, a status information memory 44 and an error data memory 45. The text memory 41 is for temporarily storing inputted input code data of the characters and symbols of the desired document inputted from the keyboard 4, the outline data having been retrieved from the hard disk in response to the code data inputted from the keyboard 4. The dot image memory 42 is for temporarily storing the dot image data of the characters and symbols of the desired document inputted from the keyboard 4 which have been converted from the outline data stored in the text memory 41 through the dot image development control program. The document information memory 43 is for storing data of a title and a size of the document desired to be printed and a cassette information such as the tape width, tape color, tape kind, and ink ribbon color of a tape cassette on which the document is desired to be printed which have been designated through operation of the keyboard 4.

The status information memory 44 is for storing status information of the tape printer 6 transferred therefrom. The status information indicates states of the tape printer 6 formed from a plurality of items related to hardware information of the tape printer 6 and communication errors occurred between the tape printer 6 and the data generator 2. The hardware information of the tape printer 6 includes: hardware error data occurred in the tape printer 6; and data related to a tape cassette CS actually loaded in the printing mechanism portion PM of the tape printer 6. The data related to the actually-loaded tape cassette CS includes tape-width data, tape-color data, tape-kind data, and ink ribbon-color data. The tape-width data, tape-color data, and tape-kind data represent a width, a color, a kind of a tape contained in the tape cassette actually loaded in the tape printer 6. The ink ribbon-color data represents color of an ink ribbon contained in the tape cassette actually loaded in the tape printer 6. The hardware error data includes information on: error occurred in memory chips such as a RAM provided in the tape printer 6, a tape cutting jam occurred in the tape cutting mechanism in the tape printer 6, a tape feeding jam occurred in the tape feeding mechanism, and a tape positioned at its end.

The error data memory 45 stores various error data occurring at the time of data generation and print processing. The error data includes the communication error data and the hardware error data retrieved from the status information memory 44 and information indicating that any of the tape-width, tape-color, tape-kind and ink ribbon-color of the tape cassette CS actually loaded in the print mechanism portion PM is not in agreement with the desired tape-width, tape-color, tape-kind, and ink ribbon-color designated by the operation of the keyboard 4.

Now, the control system of the tape printer 6 will be described.

The tape printer 6 has a control portion C2. The control portion C2 includes an input/output interface (input/output I/F) 57, which is connected to the tape-width sensor 60, the tape-color sensor 61, the tape-kind sensor 62, the ink ribbon-color sensor 59, the cassette switch 63, the tape-end sensor 64, a drive circuit 52 for driving the thermal head 16, a drive circuit 51 for driving the tape feed motor 50, and a drive circuit 53 for driving the cutter drive motor 65.

The control portion C2 further includes a CPU 54, a communication interface (I/F) 58, a ROM 55, and a RAM 56. The input/output interface 57, the communication interface 58, the ROM 55, and the RAM 56 are connected to the CPU 54 with a bus 59 such as a data bus. The ROM 55 stores: a transmission control program for transmitting and receiving data to and from the data generator 2 through the two communication interfaces 37 and 58; and a printing drive control program for driving the thermal head 16 and the tape feed motor 50 according to the dot image data transmitted from the data generator 2.

The RAM 56 includes a reception buffer, an error data memory, a cassette information memory, a print buffer, and other various memories. The reception buffer is for receiving and temporarily storing dot image data transmitted from the data generator 2 through the communication interface 58. The print buffer is for developing dot image data retrieved from the reception buffer into print output data. The error data memory is for storing status information of errors occurring in the tape printer 6. The cassette information memory is for storing cassette information as to the actually-loaded tape cassette CS. Other various memories are for temporarily storing results of operations executed in the CPU 54.

The separate-type tape printing system of the present invention having the above-described structure operates, as will be described below.

When an operator desires to produce a tape label to be attached to a file or the like, the operator operates the keyboard 4, as follows: The operator first operates the tape cassette-information designating key and then operates the alphanumeric keys, to thereby designate a tape width, a tape color and a tape kind of the tape label onto which a desired document is desired to be printed and an ink ribbon color with which a desired document is desired to be printed on the desired tape. The operator then operates a document size setting key and operates the alphanumeric keys, to thereby designate a size of the alphanumeric characters and symbols constituting the document. The operator selectively operates the automatic cut mode setting key to set the automatic cutting mode. Then, the operator operates the alphanumeric keys and symbol keys, to thereby input code data representative of the alphanumeric characters and symbols constituting the document desired to be printed on the tape label. After that, the operator operates the print key to instruct the tape printing system 1 to start printing. Then, the operator operates the document title setting key and operates the alphanumeric keys, to thereby designate a title of the document desired to be printed on the tape label.

Figure 6:
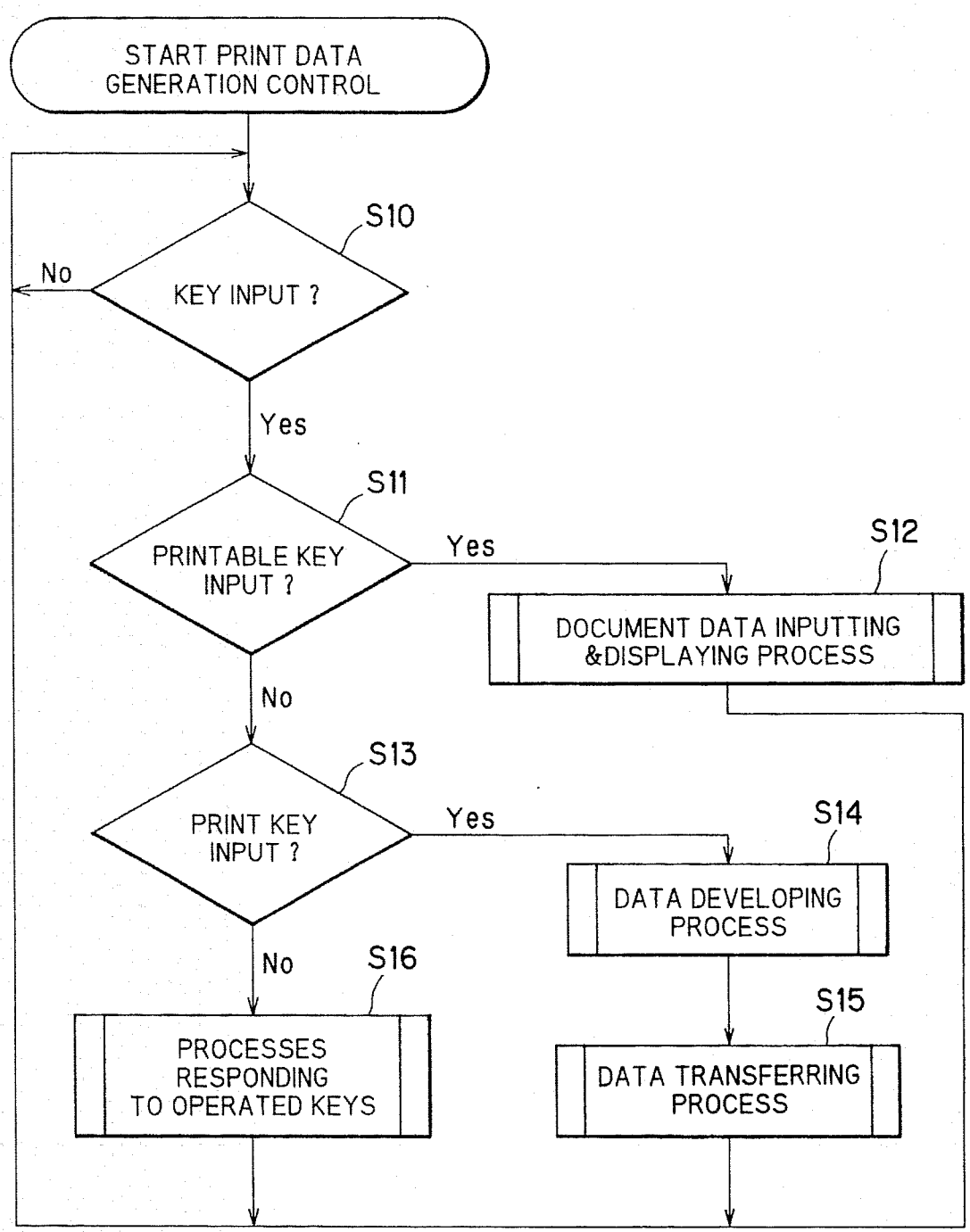
FIG. 6 is a schematic flowchart showing a routine for print data generation control.

The control portion C1 in the data generator 2 executes a routine for print data generation control, as shown in FIG. 6.

When power of the data generator 2 is turned on, the control portion C1 starts executing the print data generation control. The control portion C1 is then brought into a stand-by state for waiting for the operation of the keyboard 4, in step S10. If it is judged that the keyboard is operated ("Yes" in step S10), the control portion C1 judges, in step S11, whether the operated key is either one of the alphanumeric character key or the symbol key, indicative of the alphanumeric character or symbol printable on the label tape. If the operated key is not such keys ("No" in step S11), the control portion C1 judges whether or not the operated key is the print key, in step S13. If the operated key is not the print key ("No" in step S13), the control proceeds to step S16 to perform the operation instructed by the operated key.

When desiring to produce the tape label, as described above, the operator first operates the tape cassette-information designating key, and therefore control directly proceeds to the step S16. In this step S16, the control portion C1 receives, as the tape-color, tape-width, tape-kind and the ink ribbon-color, the alphanumeric characters operated after the operation of the tape cassette-information designating key and completed with the operation of the return key. Then, as also described above, the operator operates the document size setting key. Accordingly, the control again directly proceeds to step S16, where the control portion C1 receives, as the document size, the alphanumeric characters operated after the operation of the document size setting key and completed with the operation of the return key. Then, as also described above, the operator selectively operates the automatic cut mode setting key. In this case, the control again directly proceeds to step S16, where the control portion C1 receives the setting of the automatic cut mode.

As described above, after completing the designation of the tape-color, tape-width, tape-kind and ink ribbon-color of the tape cassette and the size of the document, the operator operates an alphanumeric character key or a symbol key to input each of alphanumeric characters or symbols constituting the document desired to be printed. Because the thus operated key indicates input code data of a character or a symbol printable on the tape, the process proceeds from the step S11 to step S12. It is noted that the operator also operates the keyboard 4 to input a data end code indicative of an end of the document. Also, the operator can operate the keyboard 4 to input the block changing code.

In the step S12, document data inputting and displaying process is executed. In the document data inputting and displaying process, the inputted input code data representative of the alphanumeric characters and symbols, the inputted block changing code and the inputted data end code constituting the document are stored into the text memory 41 of the RAM 40, as the document data. The dot pattern data for the alphanumeric characters and symbols of the document are simultaneously retrieved from the display pattern data memory in the hard disk, also in correspondence with the input code data. The control portion C1 controls the CRT display controller 30 to drive the CRT display 3, in response to the dot pattern data, so as to display the alphanumeric characters and symbols of the document inputted by the keyboard 4. In this process of the step S12, the data for the designated document size and the designated tape-color, tape-width, tape-kind and ink-ribbon color of the tape cassette are stored into the information memory 43. Then, the control returns to the step S10.

After that, the operator operates the print key, and operates the document title setting key to designate a title of the document. As a result, the process proceeds from the step S13 to step S14. In the step S14, the thus designated document title is first stored into the document information memory 43. Then, outline data representative of outlines of the alphanumeric characters and symbols constituting the document are retrieved from the font memory of the hard disk, in correspondence with the input code data now stored in the text memory 41. The outline data are then developed into dot image data. The dot image data are stored into the dot image memory 42, together with the block changing code data and the data end code. (The dot image data, the block changing code data and the data end code will be referred to as "document print data," hereinafter.) It is noted that the dot image memory 42 stores not only the document print data but also various mode setting data, such as that for setting the voltage level to be applied to the thermal head 16 in correspondence with the designated tape kind and that for setting the automatic cutting mode of the print tape 25 in correspondence with the operation of the automatic cut mode setting key, and control command data, such as that for feeding the print tape 25. The mode setting data and the control command data are stored in the memory 42, preceding the document print data.

Then, the control proceeds to step S15. In the step S15, the data transferring process is executed for transferring the document print data from the dot image memory 42 to the tape printer 6.

Figure 8:
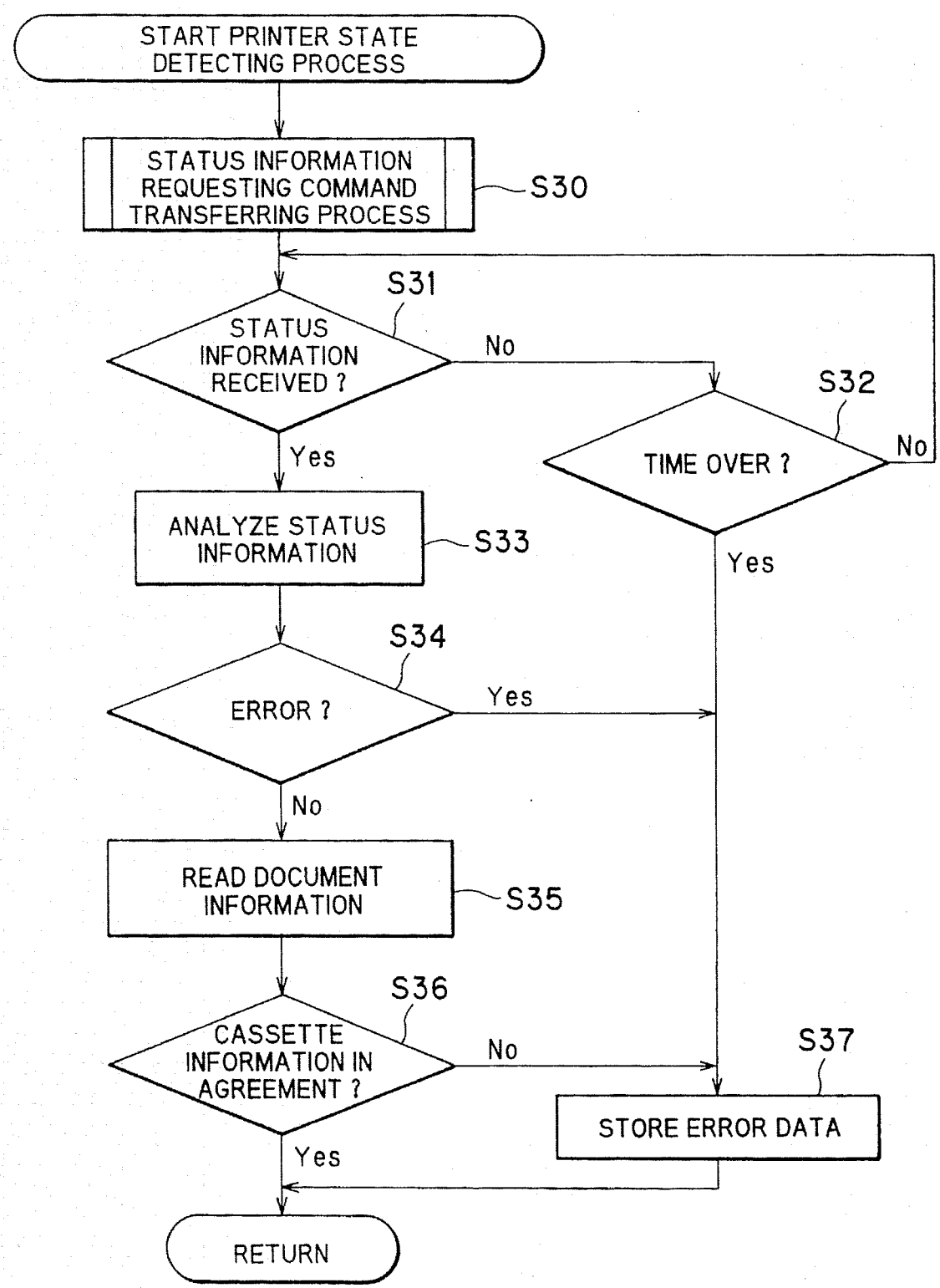
FIG. 8 is a schematic flowchart of a routine for printer state detecting process control.
Figure 9:
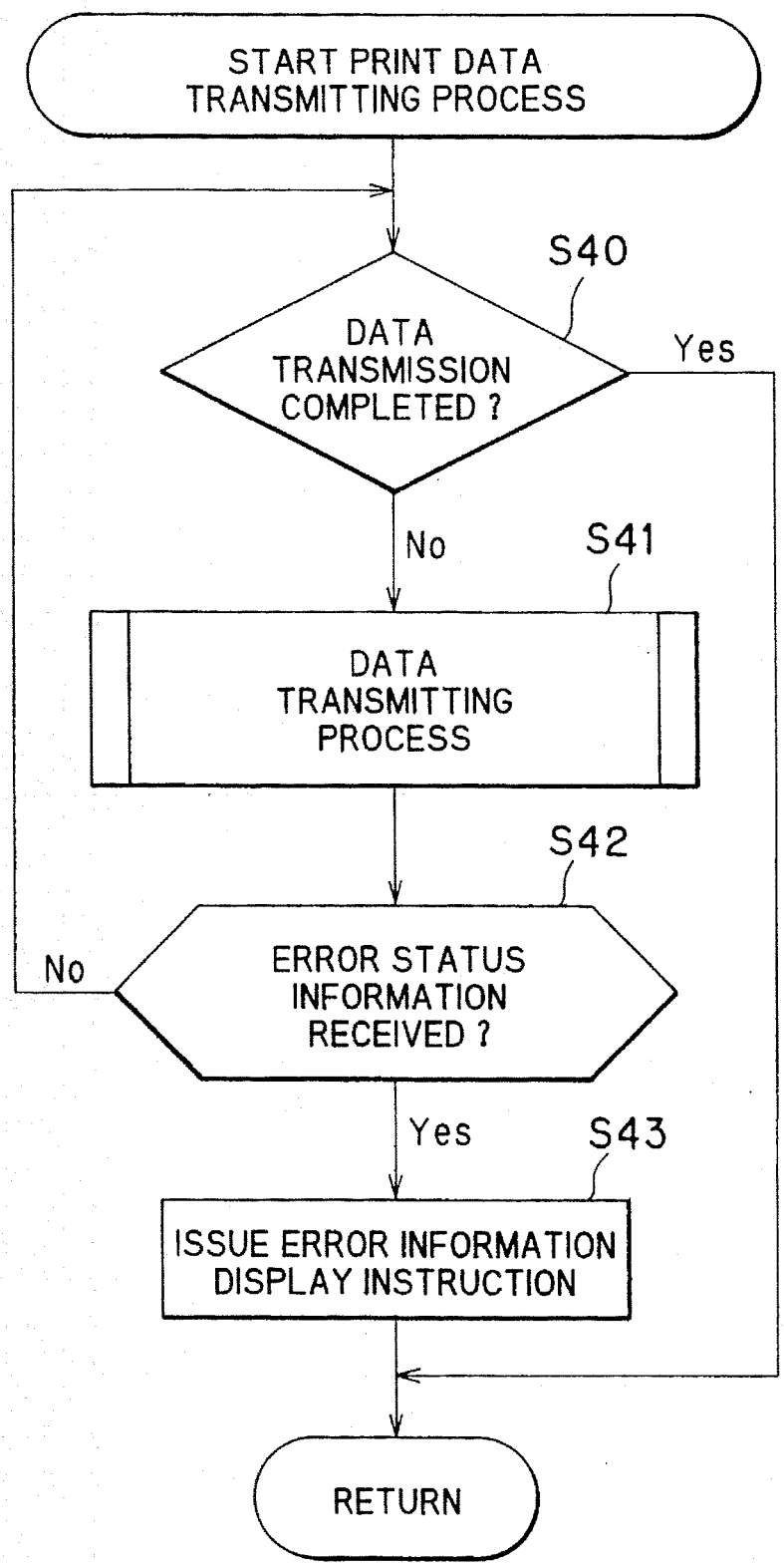
FIG. 9 is a schematic flowchart of a routine for print data transmitting process control.

The data transferring process of the step S15 will be described in detail, below, with referring to FIGS. 7 through 9.

Figure 7:
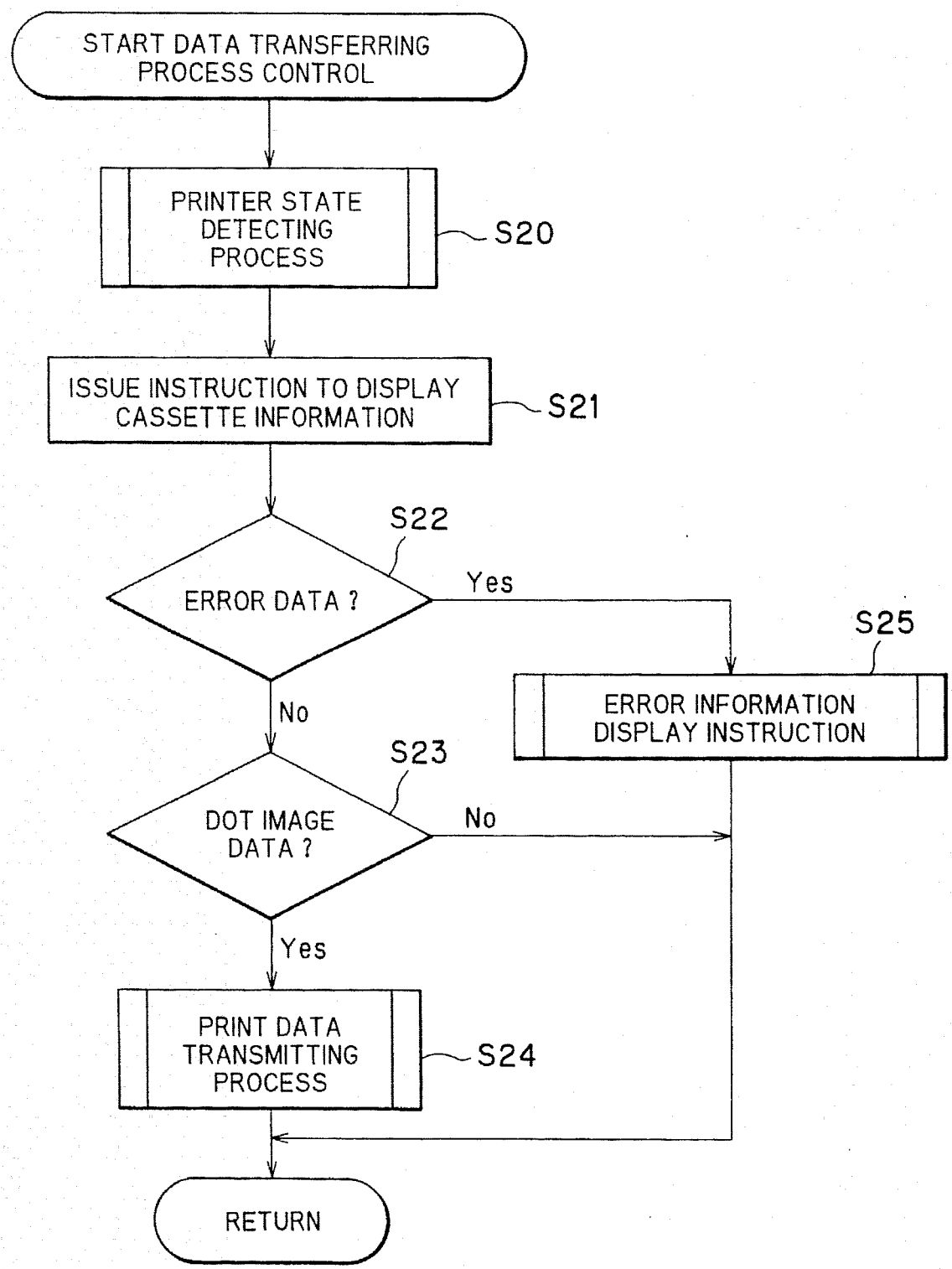
FIG. 7 is a schematic flowchart of a routine for data transferring process control.

When the data transferring process is started, a printer state detecting process is first executed in step S20, as shown in FIG. 7.

Now, the printer state detecting process of the step S20 will be described below with reference to FIG. 8.

In the printer state detecting process, the control portion C1 first performs step S30 to transfer, to the tape printer 6, a status information requesting command SCM for requesting the tape printer 6 to transfer a status information on the tape printer 6. Also in the step S30, the control portion C1 sets a predetermined waiting time, for receiving a status information from the tape printer 6, in such a device as a soft timer. Accordingly, in this step S30, the status information requesting command SCM is transferred to the communication interface 58 of the tape printer 6 through the communication interface 37 and connecting line L. If the status information SI has not yet been received from the tape printer 6 through the communication interface 37 (,i.e., "No" in the step S31) and the waiting time for the data reception has not yet been over (I.e., "No" in step S32), the steps S31 and S32 are repeatedly executed.

If the status information SI has been received from the tape printer 6 ("Yes" in the step S31), the received status information SI is analyzed in step S33. The received status information SI is the status information of the fixed length formed of the plurality of predetermined items related to hardware information of the tape printer 6 and communication errors. The hardware information includes hardware error data and data related to the tape cassette CS actually loaded in the printing mechanism portion PM, such as the tape-width data, tape-color data, tape-kind data and ink-ribbon color data.

Then, in step S34, it is judged whether or not either of the communication error or hardware error is found in the status information SI as the result of the analysis. If neither communication error nor hardware error is found in the status information SI ("No" in the step S34), the control proceeds to step S35. In the step S35, the cassette-information, indicative of the operator's designated tape-color, tape-width, tape-kind and ink-ribbon color, are retrieved from the document information memory 43. Then, in step S36, it is checked whether or not the designated cassette-information is in agreement with the hardware information, related to the actually-loaded tape cassette CS, included in the received status information SI. More specifically, it is checked whether or not the operator's desired tape-color, tape-width, tape-kind and ink-ribbon color are in agreement with the tape-color, tape-width, tape-kind and ink-ribbon color of the tape cassette CS now loaded in the printing mechanism portion PM of the tape printer 6. If they are in agreement with each other ("Yes" in the step S36), this printer state detecting process of the step S20 of FIG. 7 ends, and the control proceeds to step S21 of the data transferring process control of FIG. 7.

On the other hand, when the predetermined waiting time counted from the transfer of the status information requesting command SCM has been over ("Yes" in the step S32) without receiving the status information SI, the control proceeds to step S37. Similarly, if a communication error or hardware error is detected in the received status information SI in the step S34, or if the designated cassette-information and the received cassette information are not in agreement with each other in the step S36, the control proceeds to the step S37. In the step S37, error data corresponding to the kind of the occurred error is stored into the error data memory 45 of the RAM 40, and this control ends, and proceeds to step S21 of FIG. 7.

Then, in the data transferring control of FIG. 7, the control portion C1 outputs a display instruction to the CRT display controller 30 to control the CRT display 3 to display the cassette information on the cassette CS now loaded in the printing mechanism portion PM in the tape printer 6. As a result, the cassette information on the tape width, tape color, tape kind and ink-ribbon color of the tape cassette CS now loaded in the tape printer 6 is displayed on the CRT display 3.

Then, the control proceeds to step S22 where it is judged whether or not any error data is stored in the error data memory 45. If there is any error data in the error data memory 45, the error data is instructed to the main routine, and this data transferring control ends and returns to the main routine shown in FIG. 6. As a result, the control portion C1 controls the CRT display controller 30 to cause the CRT display 3 to display an error information corresponding to the error data, in step S25.

On the other hand, if there is stored no error data in the error data memory 45 ("No" in the step S22), the control proceeds to step S23 where it is judged whether or not dot image data are already inputted to be stored in the dot image memory 42. If there are already stored dot image data in the dot image memory 42 ("Yes" in the step S23), a print data transmitting process is executed in step S24. On the other hand, if there are not yet stored any dot image data in the dot image memory 42 ("No" in the step S23), this data transferring control ends and returns to the main routine shown in FIG. 6.

The print data transmitting control of the step S24 will be described below with reference to FIG. 9.

It is noted that the dot image memory 42 stores not only the document print data (dot image data, block changing code data, and data end code) but also the mode setting data and the control command data. (The document print data, the mode setting data and the control command data will be referred to as "print data," hereinafter.) Accordingly, when the print data transmitting process control is started, it is first judged whether or not transmission of data (print data) from the dot image memory 42 to the tape printer 6 has been completed, in step S40. If the transmission of data from the dot image memory 42 has not yet been completed ("No" in the step S40), a transmittable quantity (one byte, for example) of print data (document print data, mode setting data, and control command data) is transmitted to the tape printer 6, in step S41. During the data transmission, it is judged whether or not error information is received from the tape printer 6 in step S42. If no error information is received from the tape printer 6 ("No" in the step S42), the steps S40 to S42 are repeatedly executed. If some error information is received ("Yes" in the step S42), an instruction to display the error information is issued in step S43. Then, this print data transmitting process control ends, and then the data transferring process control of the step S15 of FIG. 6 ends, and the control return to the step S10 of the print data generation control of FIG. 6. Similarly, when the transmission of data from the dot image memory 42 is completed ("Yes" in the step S40), the control also returns to the step S10.

Now, the printing control routine executed in the controller C2 of the tape printer 6 will be described with reference to FIG. 10 to FIG. 15.

Figure 10:
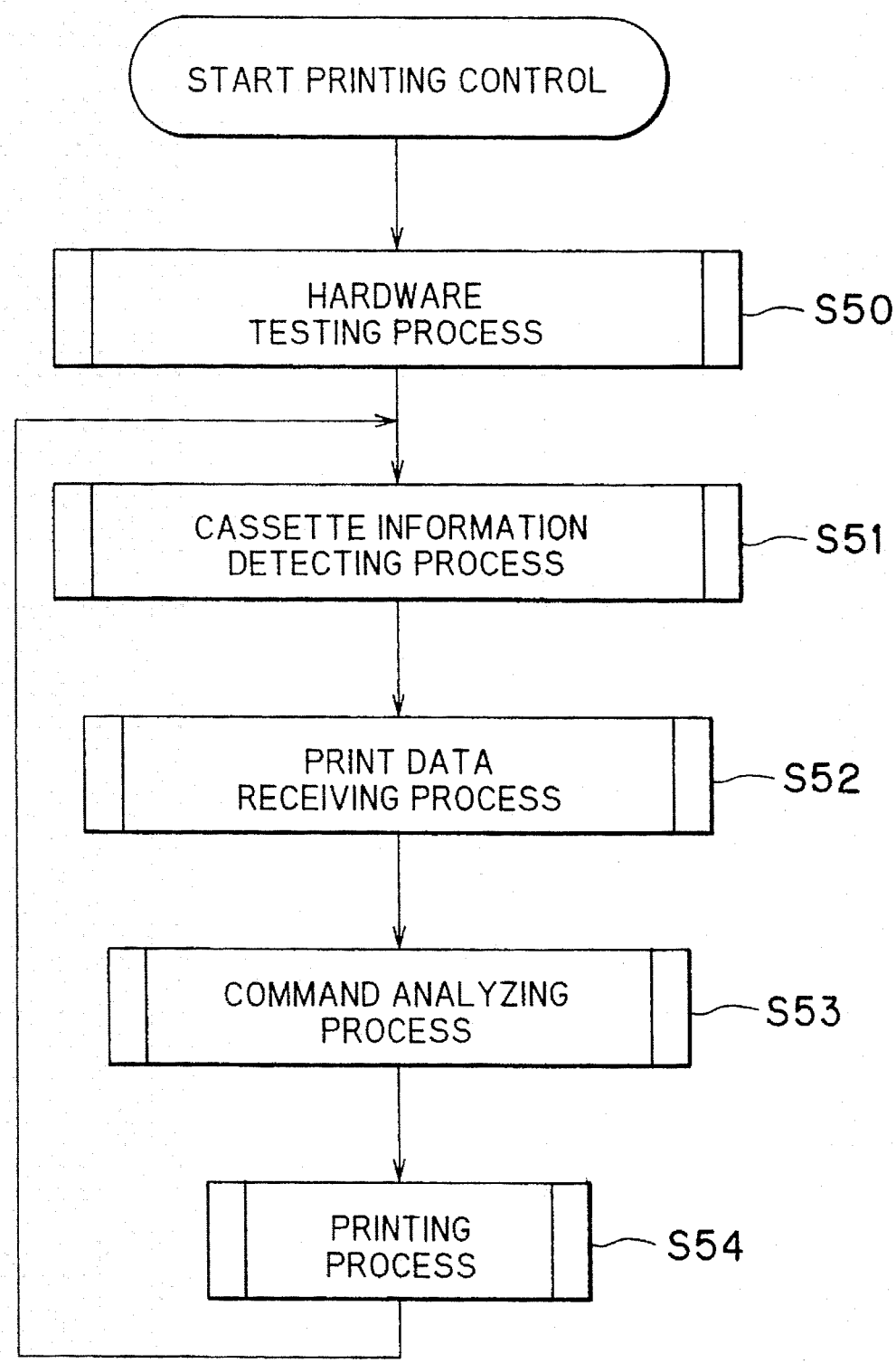
FIG. 10 is a schematic flowchart of a routine for printing control.

As shown in FIG. 10, when power for the printer 6 is turned on, a hardware testing process control of step S50 is started. When the hardware testing process control ends, the control proceeds to a cassette information detecting process control of step S51, a print data receiving process control of step S52, a command analyzing process control of step S53, and a printing process control of step S54, in this order. Then, the process returns to the step S51.

Figure 11:
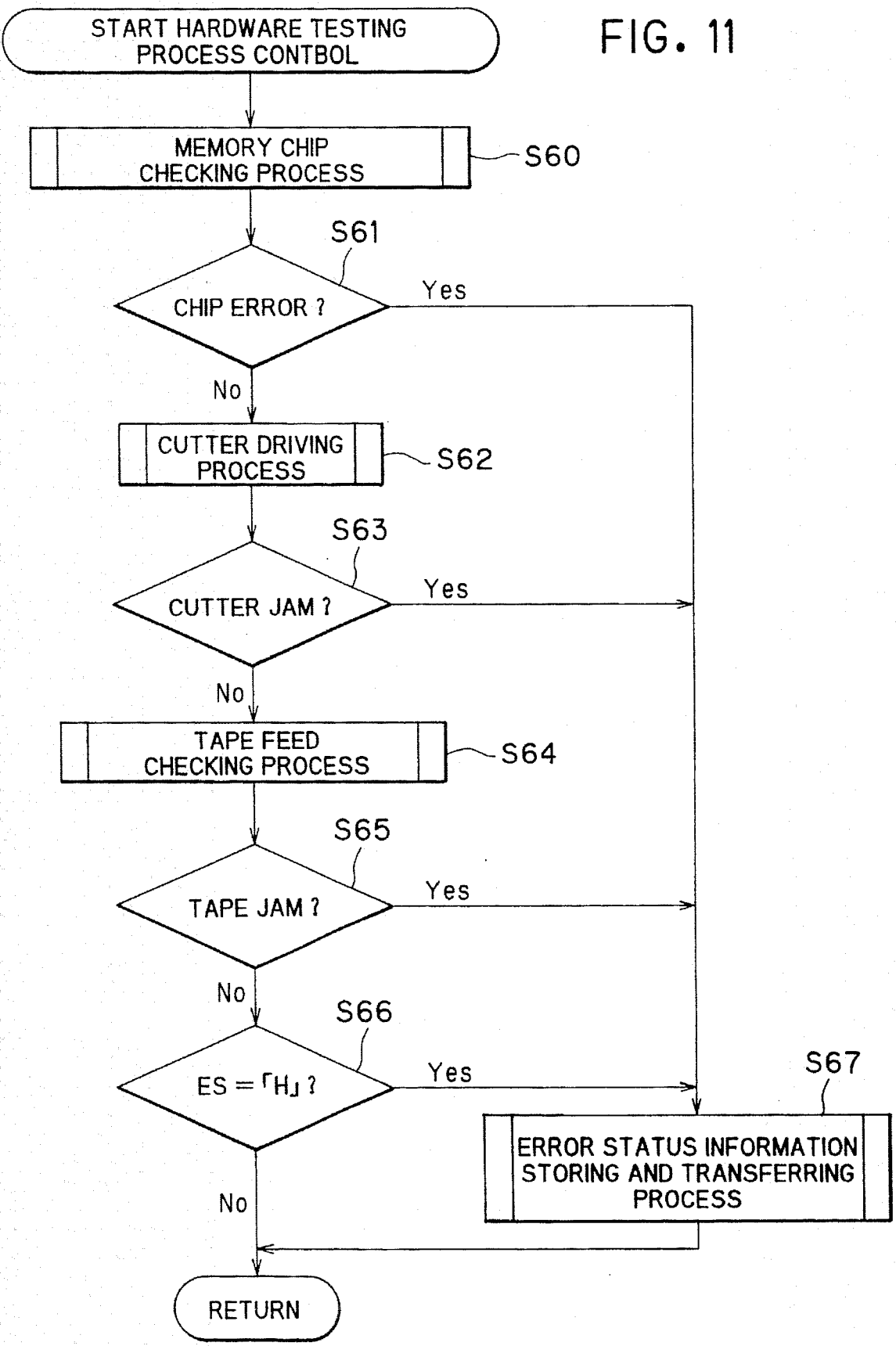
FIG. 11 is a schematic flowchart of a routine for hardware testing process control.

The hardware testing process control will be described below with referring to FIG. 11.

This control first executes a general checking process of the memory chips such as the RAM 56 in the control portion C2 in step S60. Then, it is judged whether or not any error is detected as the result of the checking process in step S61. If no error is detected as the result of the checking process ("No" in the step S61), a cutter driving process is executed in step S62 for checking whether or not the operating condition of the tape cutting mechanism is good. More specifically, in the cutter driving process of the step S62, the cutter drive motor 65 is driven so that the movable blade is driven to go and return one stroke. Then, in step S63, it is judged whether or not the cutter is normally operating, according to presence or absence of an encoder signal outputted from an encoder coupled to the cutter drive motor 65. If the cutter is determined to be normally operating ("No" in the step S63), the process proceeds to a tape feed checking process of step S64. In the step S64, the tape feed motor 50 is driven in the direction of its normal rotation by the amount corresponding to several pulses and then driven to rotate in the reverse direction. Then, in step S65, it is checked whether or not the tape feed is normal, according to the value of the electric current flowing through the tape feed motor 50. If the electric current value is regular indicating that there is present no tape jam ("No" in the step S65), the control proceeds to step S66 where a tape-end detect signal ES outputted from the tape-end sensor 64 is read out. If the signal is at an "L" level indicating that the tape is not at its end ("No" in the step S66), this hardware testing process control of the step S50 ends, and the process returns to the main routine to proceed to the step S51 of the cassette information detecting process control.

On the other hand, if some error is detected in any of the memory chips as the result of the hardware test ("Yes" in the step S61: Yes), if a cutter jam is detected in the tape cutting mechanism ("Yes" in the step S63), if a tape jam is detected ("Yes" in the step S65), or if a tape end state is detected ("Yes" in the step S66), then, the process proceeds to a step S67. In the step S67, the error status information corresponding to such a detected hardware error is stored into the error data memory of the RAM 56. This error status information is also transferred to the data generator 2, and then, the hardware testing process control ends, and returns to the main routine to proceeds to the step S51.

Figure 12:
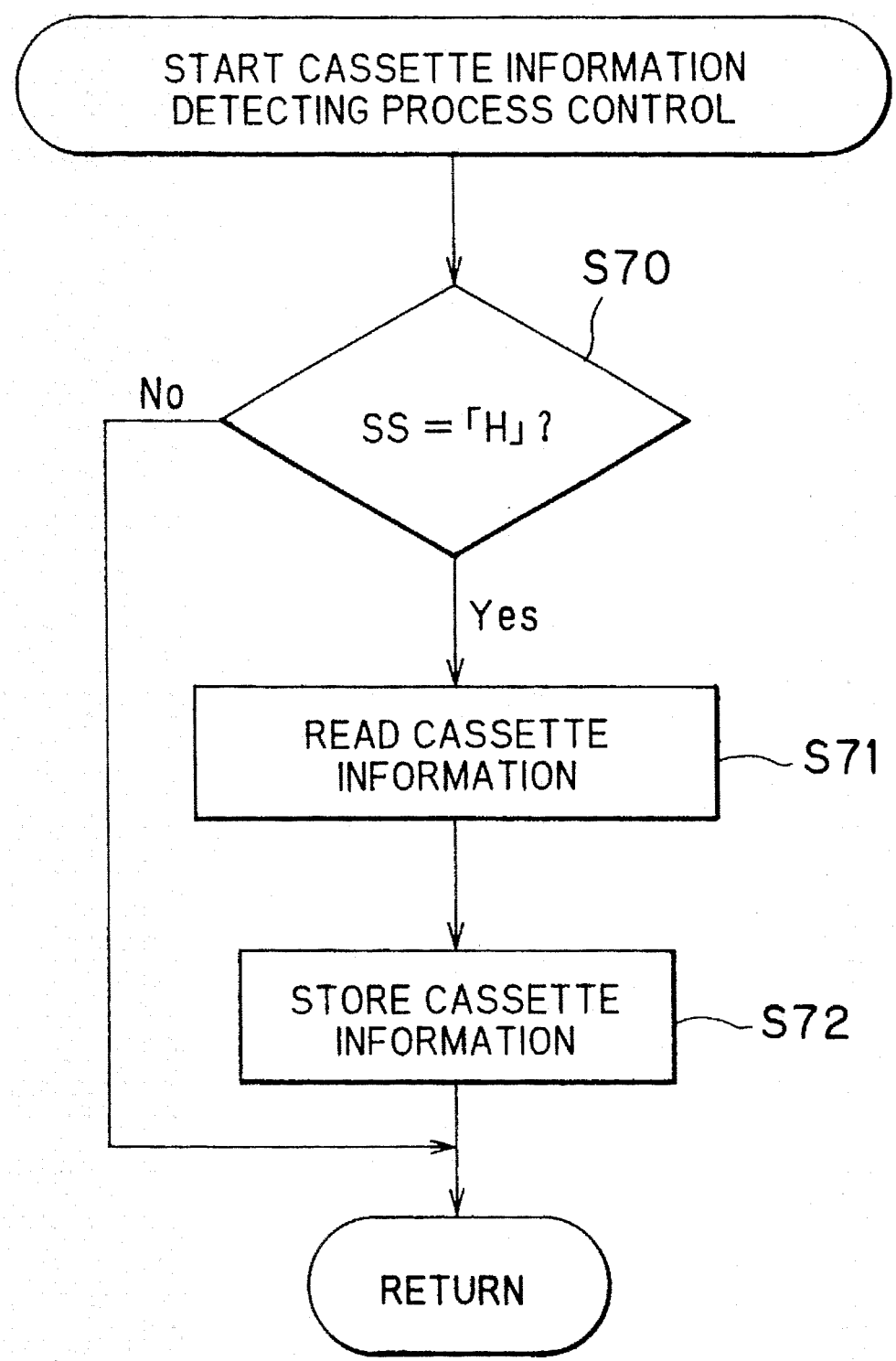
FIG. 12 is a schematic flowchart of a routine for cassette information detecting process control.

The cassette information detecting process control of the step S51 will be described below with reference to FIG. 12.

This control first executes a step S70 to judge whether or not the cassette detect signal SS outputted from the cassette switch 63 is at an "H" level indicating that the tape cassette CS is loaded in the tape printer 6. If the cassette detect signal SS is at an "H" level ("Yes" in the step S70), then, the cassette information including the tape-width, tape-color, tape-kind, and ink-ribbon color of the actually-loaded tape cassette CS is detected, in accordance with the sensor signals outputted from the sensors 59 to 62 in step S71. The obtained cassette information is then stored into the cassette information memory of the RAM 56 in step S72. Then, this cassette information detecting process control of the step S51 ends, and the control returns to a main routine to proceed to the print data receiving process control of the step S52.

Figure 13:
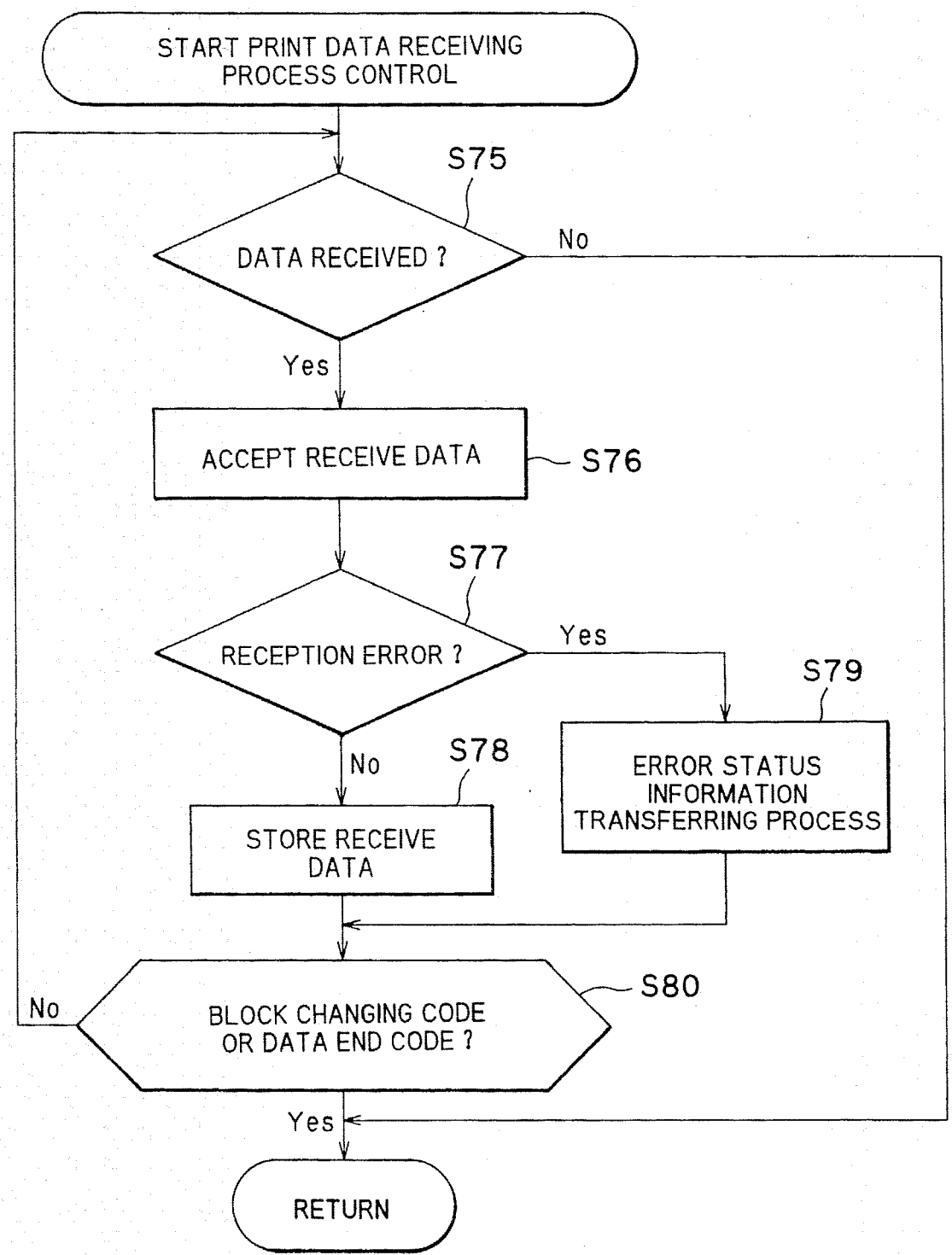
FIG. 13 is a schematic flowchart of a routine for print data receiving process control.

The print data receiving process control of the step S52 will be described below with referring to FIG. 13.

This control first executes a step S75 to judge whether or not the communication interface 58 receives any reception data which are transmitted from the data generator 2 one byte by one byte. In other words, a unit of the reception data is formed of one byte. If the interface 58 is receiving any reception data("Yes" in the step S75), the reception data is retrieved from the communication interface 58 in step S76. Then, in step S77, it is judged whether or not any reception error is occurred at the time of receiving the reception data. If there is found no reception error occurred at the time of receiving the reception data ("No" in the step S77), the reception data is stored as print data into the reception buffer of the RAM 56 in step S78. Then, the control proceeds to step S80 where it is judged whether the reception data is either a block changing code or a data end code (text end code) in step S80. If the reception data is a block changing code or a data end code ("Yes" in the step S80) or no data is being received in the communication interface 58 ("No" in the step S75), this print data receiving process control of the step ends, and returns to the main routine of FIG. 9 and proceeds to the step S53 of the command analyzing process control. On the other hand, if the reception data is neither a block changing code nor a data end code ("No" in the step S80), the control returns to the step S75. Accordingly, until the reception buffer receives the block changing code or the data end code, the dot image data, the mode setting data and the control command data transmitted from the dot image memory 42 of the data generator 2 are continuously stored, one byte by one byte, into the reception buffer in the step S78.

On the other hand, when there is found a reception error at the time of receiving the reception data ("Yes" in the step S77), an error status information related to the reception error is stored into the error data memory, and also transmitted to the data generator 2 in step S79. Then, the step S80 and the following steps are executed.

Figure 14:
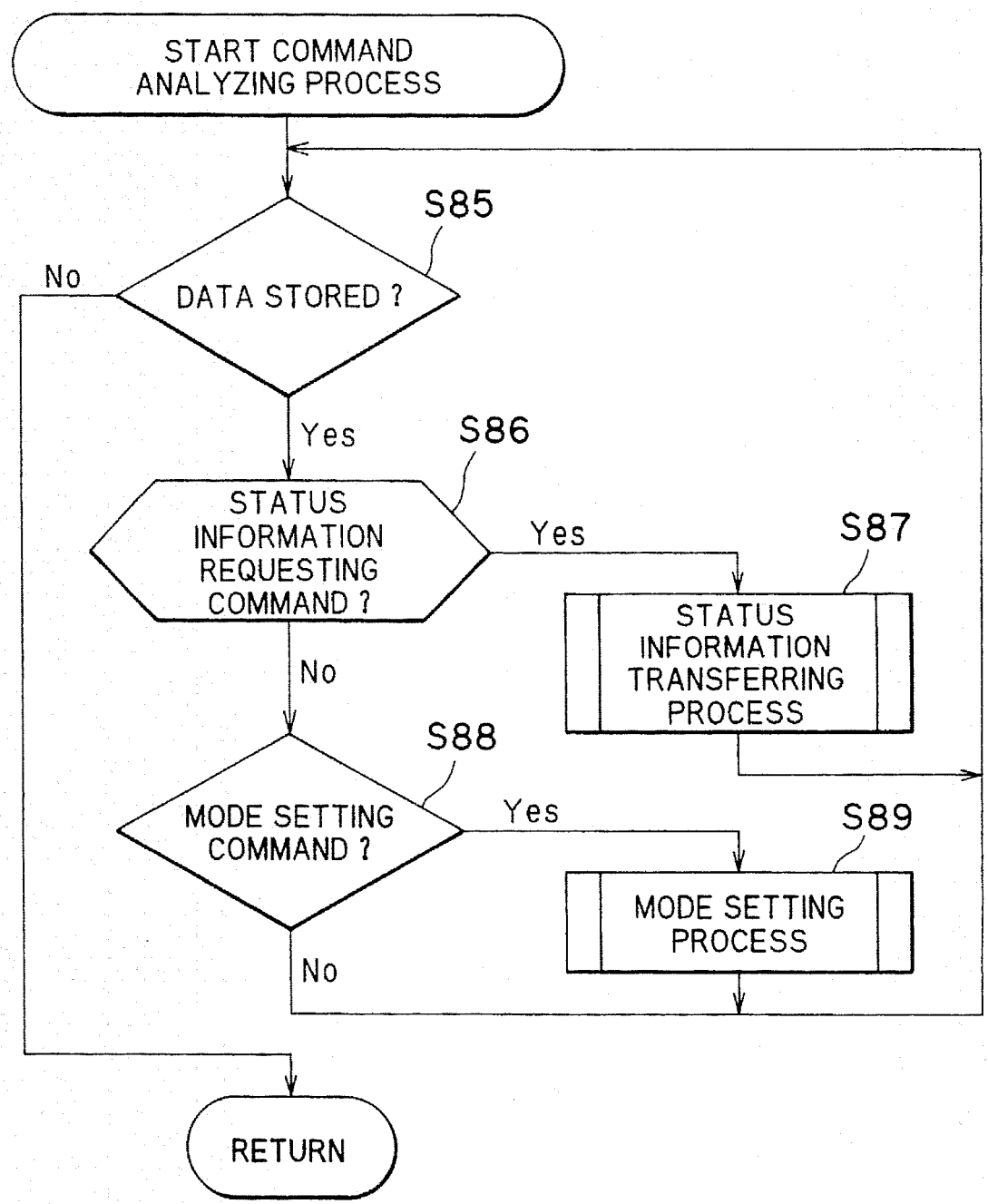
FIG. 14 is a schematic flowchart of a routine for command analyzing process control.

The command analyzing process control of the step S53 of FIG. 10 will be described below with referring to FIG. 14.

The command analyzing process control first judges whether or not there is stored any reception data in the reception buffer in step S85. If there is stored some reception data in the reception buffer ("Yes" in the step S85), the reception data is analyzed. Then, it is judged whether or not the reception data is the status requesting command SCM transmitted from the data generator 2 in step S86. If the reception data is the status requesting command SCM ("Yes" in the step S86), the control proceeds to step S87 to produce status information SI of the fixed length and consisting of the plurality of predetermined items such as the hardware information as to the printer 6 and the communication error. The status information SI is then transmitted to the data generator 2 through the communication interface 58 and the connecting line L in the step S87. Then, the control returns to the step S85. It is noted that, as described already, the hardware information includes data of the hardware error and the cassette information of the tape cassette CS loaded in the printing mechanism portion PM, such as the tape-width data, tape-color data, tape-kind data, and ink-ribbon color data.

On the other hand, as the result of the analysis of the reception data, if there is found a mode setting command received preceding the dot image data ("No" in the step S86 and "Yes" in the step S88), mode setting such as setting of the voltage level to be applied to the thermal head 16 and setting of the automatic cutting of the print tape 25 is executed in step S89. It is noted that the voltage level applied to the thermal head 16 is set in accordance with the tape kind designated through the tape cassette-information designating key. The automatic cutting mode is set only when the automatic cutting setting key is operated by the operator. Then, the control returns to the step S85.

On the other hand, when the reception data in the reception buffer is other than the status requesting command SCM or the mode setting command, i.e., when the reception data is the dot image data, the block changing code or the data end code ("No" in the step S88), the control directly returns to the step S85.

When the above-described command analyses are completed for all the reception data in the reception buffer and no reception data remains in the reception buffer in the step S85, the control ends and returns to the main routine to proceed to the print processing control of the step S54.

Figure 15:
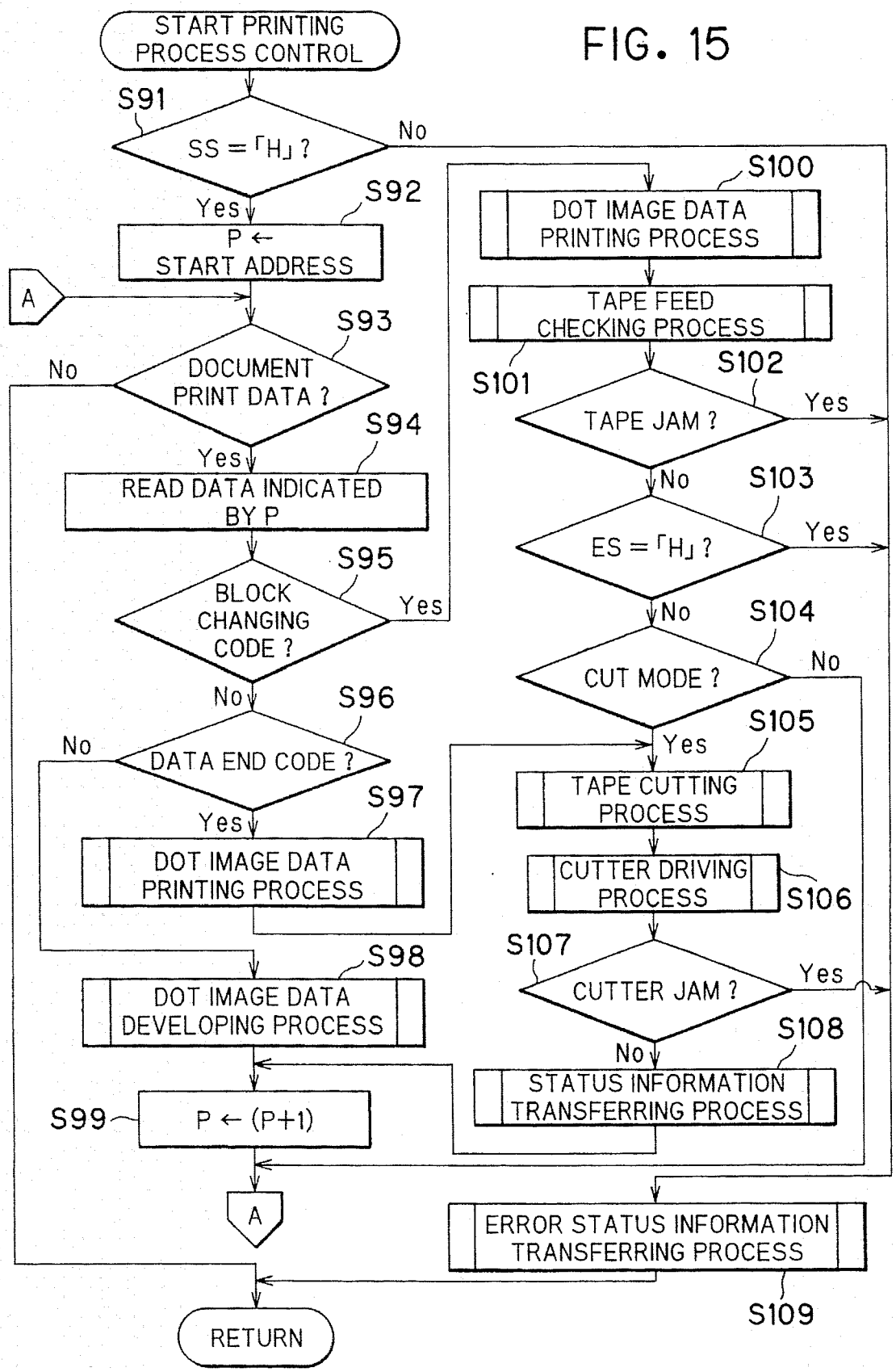
FIG. 15 is a schematic flowchart of a routine of printing process control.

Next, the print processing control of the step S54 of FIG. 10 will be described with reference to FIG. 15.

This control first judges whether or not the cassette detect signal SS at an "H" level is outputted from the cassette switch 63 indicating that a tape cassette CS is loaded, in step S91. If the cassette detect signal SS at an "L" level is outputted from the cassette switch 63 ("No" in the step S91), status information including the error that the tape cassette CS is not loaded is transmitted to the data generator 2 in step S109. Then, the control ends, and returns to the main routine of FIG. 10 to proceed to the step S50.

On the other hand, if the cassette detect signal SS at an "H" level is outputted from the cassette switch 63 indicating that a tape cassette CS is loaded ("Yes" in the step S91), the start address of the data stored in the reception buffer is set in the data pointer P in step S92. The control proceeds to step S93 to judge whether or not the document print data is stored at the address indicated by the data pointer P. If the document print data is stored at the address indicated by the data pointer P ("Yes" in step S93), the document print data at the address indicated by the data pointer is retrieved from the reception buffer in step S94. Then, the control proceeds to steps S95 and S96 to judge whether or not the document print data is the block changing code or the data end code. If the data is not the block changing code or data end code ("No" in the steps S95 and S96), the data is determined as dot image data. Accordingly, the control proceeds to step S98 to develop the dot image data on the print buffer of the RAM 56. Then, the data pointer P is incremented by 1 in step S99, and the control returns to the step S93.

On the other hand, if the data at the address indicated by the data pointer P is a block changing code ("Yes" in the step S94), the control proceeds to step S100 to print the dot image data, which have been developed on the print buffer, on the print tape 25 by the printing mechanism portion PM (S100). Then, it is checked whether or not the tape feed is normal in step S101. More specifically, in the step S100, the tape feed motor 50 is driven in the direction of its normal rotation for several pulses and then in the reverse direction, to thereby detect whether or not the tape feed is normal according to the value of the electric current flowing through the tape feed motor 50. The control proceeds to step S102 to judge whether or not the value of the electric current is normal to indicate that there occurs no tape jam. If the value of the electric current is normal indicating that there occurs no tape jam ("No" in the step S102), the control proceeds to step S103 to read out the tape-end detect signal ES outputted from the tape-end sensor 64. If the tape-end detect signal ES is at an "L" level indicating that the tape is not at its end ("No" in the step S103), the control proceeds to step S104 to search the presently-set mode. If the automatic cut mode is not set in step S104, the tape cutting mechanism is not driven to cut the print tape 25, and the control returns to the step S93.

On the other hand, if the automatic cut mode is set in the step S104, the cutter drive motor 65 is rotated to drive the tape cutting mechanism to cut the print tape 25 in step S105. Then, the control proceeds to step S106 to check whether or not the tape cutting mechanism is normally operating. More specifically, in the step S106, the cutter drive motor 65 is rotated so that the movable blade goes and returns one stroke. Then, the control proceeds to step S107 to judge whether or not the tape cutting mechanism is operating normally on the basis of the presence or absence of the encoder signal from the encoder. If it is found that the cutter is operating normally on the basis of the presence or absence of the encoder signal from the encoder ("No" in the step S107), status information, if any, is transferred to the data generator 2 in step S108, and the control returns to the step S99.

On the other hand, if the data at the address indicated by the data pointer P is the data end code ("Yes" in the step S96), the dot image data which have been developed on the print buffer is printed on the print tape 25 by the printing mechanism portion PM in step S97. Then, the steps S105–S108 and S99 are executed, and the control returns to the step S93.

When the printing of the data in the reception buffer is completed and no data remains in the reception buffer in step S93, the control ends, and returns to the main routine to proceed to the step S50.

On the other hand, if a tape jam is detected in the step S102, if the tape-end detect signal ES is at an "H" level indicating that the tape is at its end in the step S103, or if the cutter is in a jammed state in the step S107, the error status information including the corresponding error is transmitted to the data generator 2 in step S109. Then, this printing process control ends, and returns to the main routine to proceed to the step S50. As a result, the printing process is suspended, and an error message is displayed on the CRT display 3.

As described in the foregoing, the cassette information about the tape cassette CS loaded in the printing mechanism PM of the printer 6 including the tape width, the tape color, the tape kind, and the ink ribbon color is detected. The detected information is transferred to the data generator 2 through the two communication interfaces 37 and 58 to be displayed on the CRT display 3 of the data generator 2. Accordingly, the operator can simply recognize the tape width, tape color, tape kind and ink ribbon color of the tape cassette CS from the display while being on the side of the data generator 2, without the need for going over to the printer 6 which is separated from the data generator 2. Further, it can be confirmed whether the print tape 25 is the desired tape from the displayed cassette information, whereby the print tape 25 is prevented from being used wastefully and it is ensured that a rightful print tape 25 is used to achieve correct outputting for printing.

AS to the transfer of the cassette information, status information including the cassette information may be transferred from the printer 6 to the data generator 2 any time in response to the status requesting command outputted while document data is being input or edited. When the tape printing system is configured to form of a system with a plurality of data generators 2 connected to one printer 6, status information including cassette information may be outputted to the data generator that issues the status information requesting command.

According to the tape printing system of the present invention, as described above, there are provided the cassette information detection portion and the information transfer portion and, further, the data generator is provided with the information display control portion and, therein, the cassette information including at least the tape width and the tape color of the tape in the tape cassette loaded in the printer is detected and transferred to the data generator to be displayed on the display portion provided in the data generator. Accordingly, the operator can simply recognize at least the tape width and tape color of the tape in the tape cassette from the display while being on the side of the data generator, without the need for going over to the printer which is separated from the data generator. Further, it can be confirmed whether the print tape is the desired tape from the displayed cassette information, whereby the tape is prevented from being used wastefully and it is ensured that a rightful print tape is used to achieve correct outputting for printing.

While the invention has been described in detail with reference to a specific embodiment thereof, it would be apparent to those skilled in the art that various changes and modifications may be made therein without departing from the spirit of the invention.

For example, the present invention can be applied to various tape printing systems or apparatuses including a display, a keyboard, and a printer.

The cassette switch 63 may be omitted. It is possible to detect whether or not a tape cassette is loaded in the printing mechanism portion PM by the sensors 59 through 62. More specifically, it is possible to detect that a tape cassette is not loaded in the portion PM when any of the sensors 59 through 62 do not detect information.

In the above-described embodiment, the voltage level to be applied to the thermal head is set in accordance with the tape kind designated by the tape cassette-information setting key. However, the keyboard 4 may be provided with a color density setting key for designating color density of characters and symbols desired to be printed on a tape label. In this case, the voltage level may be set in accordance with the operator's designated color density.

The printing system of the above-described example is designed exclusively for English language characters and symbols. However, the printing system of the present invention may be freely designed for any language characters and symbols. The printing system of the present invention can also be applied to print various complicated images onto a tape. More specifically, the controller 5 can produce various simple or complicated images, in response to the operation of the keyboard 4 and the mouse 39, and can develop the images into dot image data to be used for printing by the printing mechanism portion PM in the tape printer 6.

What is claimed is:

1. A tape printing system for printing a desired image on a desired tape, comprising:

a data inputting device for inputting data indicative of the desired image, the data inputting device including displaying means for displaying the desired image and desired cassette information inputting means for inputting information on a tape cassette desired to be printed with the desired image; and a tape printing device connected to the data inputting device with a connecting line for receiving data transferred through the connecting line from the data inputting device and for printing the desired image on a desired tape based on the received data, the tape printing device including information transferring means for transferring information relating to the tape to the data inputting device through the connecting line, the information relating to the tape being displayed on the displaying means, wherein the data inputting device further includes display controlling means for controlling the displaying means to display the information relating to the tape transferred from the tape printing device, wherein the tape printing device includes tape cassette receiving means for receiving a received tape cassette containing the tape and for printing the desired image on the tape contained in the received tape cassette, and wherein the information transferring means includes cassette information detecting means for detecting information on the received tape cassette and for transferring the information on the received tape cassette to the data inputting device through the connecting line; and wherein the data inputting device further includes information judging means for judging whether the information on the desired tape cassette inputted from the desired cassette information inputting means agrees with the information on the received tape cassette transferred from the cassette information detecting means.

2. A tape printing system of claim 1, wherein the tape cassette has a projecting piece formed with at least one projecting claw representing the information on the tape cassette, and wherein the cassette information detecting means includes at least one photocoupler provided in the tape cassette receiving means for receiving the at least one projecting claw of the tape cassette to thereby detect the cassette information on the tape cassette.

3. A tape printing system of claim 2, wherein the information on the tape cassette includes color of a tape contained in the tape cassette.

4. A tape printing system of claim 2, wherein the information on the tape cassette includes width of a tape contained in the tape cassette.

5. A tape printing system of claim 2, wherein the information on the tape cassette includes kind of a tape contained in the tape cassette.

6. A tape printing system of claim 2, wherein the information on the tape cassette includes color of an ink ribbon contained in the tape cassette.

7. A tape printing system of claim 1, wherein the information transferring means further transfers information on the tape printing device through the connecting line to the data inputting device, the display controlling means controlling the displaying means to display the information on the tape printing device transferred from the tape printing device.

8. A tape printing system of claim 7, wherein the tape printing device further includes tape feeding means for feeding the tape contained in the tape cassette received in the tape cassette receiving means.

9. A tape printing system of claim 8, wherein the information transferring means includes tape feed information detecting means for detecting information on a tape feeding status of the tape feeding means and for transferring the information on the tape feeding status to the data inputting device, the display controlling means controlling the displaying means to display the information on the tape feeding status.

10. A tape printing system of claim 8, wherein the information transferring means includes tape end detecting means for detecting whether or not the tape contained in the tape cassette reaches its end according to the tape feeding means and for transferring the detected result to the data inputting device, the display controlling means controlling the displaying means to display the detected result.

11. A tape printing system of claim 7, wherein the tape printing device further includes tape cutting means for cutting the tape printed with the desired image and outputted from the tape cassette received in the tape cassette receiving means, and wherein the information transferring means includes tape cut information detecting means for detecting information on a tape cutting status of the tape cutting means and for transferring the tape cutting status to the data inputting device, the display controlling means controlling the displaying means to display the information on the tape cutting status.

12. A tape printing system of claim 1, wherein the data inputting device includes:

code data inputting means for inputting code data indicative of at least one image element constituting the desired image;

outline data storing means for storing outline data of each of a number of image elements represented by code data inputtable by the code data inputting means; and data developing means for developing the outline data of the at least one image element constituting the desired image into dot image data, in accordance with the inputted code data; and data transferring means for transferring the developed dot image data to the tape printing device through the connecting line, and wherein the tape printing device further includes a thermal head for driving in response to the dot image data to print the desired document on the tape.

13. A tape printing system of claim 1, wherein the information relating to the tape includes information relating to a width of the tape.

14. A tape printing apparatus for printing a desired image on a tape, comprising:

a data generator for generating dot image data indicative of the desired image, the data generator including:

input means for inputting characters and symbols constituting the desired image and for inputting various commands;

data storage means for storing data that includes the inputted characters and symbols;

display means for displaying the inputted characters and symbols; and data development means for developing the data received from said data storage means into the dot image data for the print output; and a printer connected with the data generator by a connecting line for receiving the dot image data from the data generator to print the desired image on the tape, the printer including:

a tape cassette loading portion for loading a tape cassette containing a roll of tape as printing medium and a roll of ink ribbon to be used for printing on the tape;

a printing portion for driving in response to the dot image data transferred from the data generator to print the desired image in dot patterns on the tape from the tape cassette;

cassette information detection means for detecting cassette information including at least one of tape width and ink ribbon color of the tape cassette loaded in the tape cassette loading portion; and information transfer means for transferring the cassette information detected by said cassette information detection means to said data generator through the connecting line, the cassette information being displayed on the display means of the data generator, wherein the data generator further includes:

desired cassette information inputting means for inputting information on a desired tape cassette desired to be printed with the desired image, which includes at least one of a desired tape width and a desired ink ribbon color; and information judging means for judging whether the information on the desired tape cassette inputted from the desired cassette information inputting means agrees with the cassette information detected by the cassette information detection means.

15. A tape printing apparatus of claim 14, wherein the printing portion includes:

tape feeding means for feeding the tape contained in the tape cassette;

printing means for driving in response to the dot image data to print the desired document in dot patterns on the tape contained in the tape cassette fed by the tape feeding means; and cutting means for cutting the tape printed with the desired document by the printing means; and wherein the tape printer further includes print information detection means for detecting the status of at least one of the tape feeding means, the printing means and the cutting means, the information transfer means transferring the status detected by the print information detection means to said data generator through the connecting line, the information display control means receiving the information on the status transferred from the information transfer means and for controlling the display means to display the information on the status.

* * * * *